United States Patent
Hisaoka et al.

(10) Patent No.: US 11,925,858 B2
(45) Date of Patent: Mar. 12, 2024

(54) SERVER, CONTROL METHOD THEREFOR, COMPUTER-READABLE RECORDING MEDIUM, AND GAME SYSTEM

(71) Applicant: GREE, Inc., Tokyo (JP)

(72) Inventors: Yusuke Hisaoka, Tokyo (JP); Makiko Tamura, Tokyo (JP); Yuji Okada, Tokyo (JP); Takahiro Mori, Tokyo (JP); Mitsuo Iwao, Tokyo (JP)

(73) Assignee: GREE, Inc., Tokyo (JP)

( * ) Notice: Subject to any disclaimer, the term of this patent is extended or adjusted under 35 U.S.C. 154(b) by 72 days.

(21) Appl. No.: 17/673,501

(22) Filed: Feb. 16, 2022

(65) Prior Publication Data

US 2022/0168632 A1 Jun. 2, 2022

Related U.S. Application Data

(63) Continuation of application No. 16/902,427, filed on Jun. 16, 2020, now Pat. No. 11,278,800, which is a (Continued)

(30) Foreign Application Priority Data

Mar. 4, 2013 (JP) .................................. 2013-042162
Aug. 29, 2013 (JP) .................................. 2013-177713
Sep. 26, 2013 (JP) .................................. 2013-200439

(51) Int. Cl.
*A63F 13/46* (2014.01)
*A63F 13/25* (2014.01)
(Continued)

(52) U.S. Cl.
CPC .............. *A63F 13/35* (2014.09); *A63F 13/25* (2014.09); *A63F 13/44* (2014.09); *A63F 13/46* (2014.09);
(Continued)

(58) Field of Classification Search
CPC .......... A63F 13/10; A63F 13/12; A63F 13/30; A63F 13/40; A63F 13/44; A63F 13/45; A63F 13/46; A63F 13/48; A63F 13/50
See application file for complete search history.

(56) References Cited

U.S. PATENT DOCUMENTS

| 5,390,937 A | 2/1995 | Sakaguchi et al. |
| 5,649,862 A | 7/1997 | Sakaguchi et al. |

(Continued)

FOREIGN PATENT DOCUMENTS

| JP | 2001-137534 A | 5/2001 |
| JP | 2002-369968 A | 12/2002 |

(Continued)

OTHER PUBLICATIONS

"Instruction Manual Magic The Gathering", "Micro Prose", 1997, pp. 14-16.*

(Continued)

*Primary Examiner* — Omkar A Deodhar
(74) *Attorney, Agent, or Firm* — Maier & Maier, PLLC

(57) ABSTRACT

A recording medium and server provide a game that improves the interest in and taste of a battle event and increases the interest in and real enjoyment of the entire game. The recording medium provides a game including a predetermined battle event comprising at least one battle. In a battle event of this game, game contents are displayed in a first field, and a player selects therefrom a game content to be used for a battle with an enemy character. The first field is replenished with another game content alternative to the selected game content as needed so that the player can further select an additional game content therefrom.

20 Claims, 9 Drawing Sheets

Related U.S. Application Data continuation of application No. 16/427,523, filed on May 31, 2019, now Pat. No. 10,974,141, which is a continuation of application No. 15/943,867, filed on Apr. 3, 2018, now Pat. No. 10,960,305, which is a continuation of application No. 15/391,157, filed on Dec. 27, 2016, now Pat. No. 9,956,481, which is a continuation of application No. 14/929,738, filed on Nov. 2, 2015, now Pat. No. 9,604,137, which is a continuation of application No. 14/194,466, filed on Feb. 28, 2014, now Pat. No. 9,205,337.

(51) Int. Cl.
  *A63F 13/35* (2014.01)
  *A63F 13/44* (2014.01)
  *A63F 13/814* (2014.01)
  *A63F 13/822* (2014.01)
  *A63F 13/95* (2014.01)

(52) U.S. Cl.
  CPC .......... *A63F 13/814* (2014.09); *A63F 13/822* (2014.09); *A63F 13/95* (2014.09)

(56) References Cited

U.S. PATENT DOCUMENTS

| | | | |
|---|---|---|---|
| 5,662,332 | A | 9/1997 | Garfield |
| 6,322,077 | B1 | 11/2001 | Braunlich et al. |
| 6,419,584 | B1 | 7/2002 | Sakamoto et al. |
| 6,544,119 | B2 | 4/2003 | Kubo et al. |
| 6,554,702 | B2 | 4/2003 | Mahar et al. |
| 6,729,621 | B2 | 5/2004 | Moody |
| 7,033,275 | B1 | 4/2006 | Endo et al. |
| 7,118,107 | B2 | 10/2006 | Niedner et al. |
| 7,371,165 | B2 | 5/2008 | Reizei et al. |
| 8,109,818 | B2 | 2/2012 | Pottinger et al. |
| 8,118,673 | B2 | 2/2012 | Coleman et al. |
| 8,439,750 | B2 | 5/2013 | Kawamoto |
| 8,814,685 | B2 | 8/2014 | Sugiyama |
| 9,101,828 | B2 | 8/2015 | Yoshie et al. |
| 9,511,285 | B2 | 12/2016 | Hawkins, III |
| 2003/0053119 | A1 | 3/2003 | Yamada et al. |
| 2003/0109299 | A1 | 6/2003 | Reizei et al. |
| 2004/0143852 | A1 | 7/2004 | Meyers |
| 2005/0054402 | A1 | 3/2005 | Noguchi et al. |
| 2007/0202952 | A1 | 8/2007 | Francis et al. |
| 2008/0125220 | A1 | 5/2008 | Sakaguchi |
| 2009/0042629 | A1 | 2/2009 | Yamashita et al. |
| 2010/0304856 | A1 | 12/2010 | Coleman et al. |
| 2010/0304862 | A1 | 12/2010 | Coleman et al. |
| 2011/0022976 | A1 | 1/2011 | Huang |
| 2011/0151976 | A1 | 6/2011 | Holloway et al. |
| 2011/0312395 | A1 | 12/2011 | Nakamura et al. |
| 2012/0064969 | A1 | 3/2012 | Uchibori |
| 2013/0225286 | A1 | 8/2013 | Ikeda |
| 2013/0288787 | A1 | 10/2013 | Yoshie et al. |
| 2014/0038715 | A1 | 2/2014 | Ikeda |
| 2014/0066199 | A1 | 3/2014 | Takagi et al. |
| 2014/0080599 | A1 | 3/2014 | Shimono et al. |

FOREIGN PATENT DOCUMENTS

| | | | |
|---|---|---|---|
| JP | 2003-117229 A | 4/2003 |
| JP | 2003-144750 A | 5/2003 |
| JP | 2003-175277 A | 6/2003 |
| JP | 2005-034277 A | 2/2005 |
| JP | 2006-223904 A | 8/2006 |
| JP | 3863437 B2 | 10/2006 |
| JP | 3925561 B2 | 6/2007 |
| JP | 2007-260012 A | 10/2007 |
| JP | 2008-055096 A | 3/2008 |
| JP | 2008-132331 A | 6/2008 |
| JP | 2008-142181 A | 6/2008 |
| JP | 2008-142352 A | 6/2008 |
| JP | 2008-220984 A | 9/2008 |
| JP | 2010-17300 A | 1/2010 |
| JP | 4693936 B1 | 6/2011 |
| JP | 2012-061059 A | 3/2012 |
| JP | 2012-61060 A | 3/2012 |
| JP | 5113943 B1 | 1/2013 |
| JP | 2013-34624 A | 2/2013 |
| JP | 2014-168586 A | 9/2014 |
| JP | 6472861 B2 | 2/2019 |
| JP | 2001-129258 A | 5/2021 |
| KR | 10-2010-0110711 A | 10/2010 |

OTHER PUBLICATIONS

Exhibit A-9—Preliminary Invalidity Contentions—U.S. Pat. No. 9,604,137 to Hisaoka, et al. Based on U.S. Patent App. Publication No. 2008/0125220 to Sakaguchi ("Sakaguchi"), In Re.: *Gree, Inc* v. *Supercell OY*, Civil Action No. 2:19-cv-00070-JRG-RSP, Sep. 19, 2019, 59 pgs.

Exhibit A-10—Preliminary Invalidity Contentions—U.S. Pat. No. 9,604,137 to Hisaoka, et al. Based on US Patent Appln Publn No. 2010/0304862 A1 to J. Todd Coleman et al. ("Coleman"), In Re.: *Gree, Inc* v. *Supercell OY*, Civil Action No. 2:19-cv-00070-JRG-RSP, Sep. 19, 2019, 54 pages.

Exhibit A-11—Preliminary Invalidity Contentions—U.S. Pat. No. 9,604,137 to Hisaoka, et al. Based on US Patent Appln Publication No. 2012/0064969 to Tamaki Uchibori ("Uchibori"), In Re.: *Gree, Inc* v. *Supercell OY*, Civil Action No. 2:19-cv-00070-JRG-RSP, Sep. 19, 2019, 73 pages.

Exhibit A-12—Preliminary Invalidity Contentions—U.S. Pat. No. 9,604,137 to Hisaoka, et al., Based on U.S. Pat. No. 5,662,332 to Richard Garfield ("Garfield"), In Re.: *Gree, Inc* v. *Supercell OY*, Civil Action No. 2:19-cv-00070-JRG-RSP, Document 024, Sep. 19, 2019, 46 pages.

Exhibit A-13—Preliminary Invalidity Contentions—U.S. Pat. No. 9,604,137 to Hisaoka, et al., Based on U.S. Pat. No. 6,554,702 to Shaun Mahar et al. ("Mahar"), In Re.: *Gree, Inc* v. *Supercell OY*, Civil Action No. 2:19-cv-00070-JRG-RSP, Sep. 19, 2019, 51 pages.

Exhibit A-14—Preliminary Invalidity Contentions—U.S. Pat. No. 9,604,137 to Hisaoka, et al., Based on U.S. Pat. No. 9,511,285 to William M. Hawkins, III ("Hawkins"), In Re.: *Gree, Inc* v. *Supercell OY*, Civil Action No. 2:19-cv-00070-JRG-RSP, Sep. 19, 2019, 40 pages.

Exhibit A-15—Preliminary Invalidity Contentions—U.S. Pat. No. 9,604,137 to Hisaoka, et al., Based on US Patent Application Publication No. 2003/0109299 to Hirotaka Reizei ("Reizei"), In Re: *Gree, Inc* v. *Supercell OY*, Civil Action No. 2:19-cv-00070-JRG-RSP, Sep. 19, 2019, 58 pgs.

Exhibit B-1—Preliminary Invalidity Contentions—U.S. Pat No. 9,956,481 to Hisaoka, et al. Based on Arcomage Manual (1999) & Prima's Official Strategy Guide: Might and Magic VII for Blood and Honor (1999) ("Arcomage"), In Re: *Gree, Inc* v. *Supercell OY*, Civil Action No. 2:19-cv-00070-JRG-RSP, Sep. 19, 2019, 77 pgs.

Exhibit B-2—Preliminary Invalidity Contentions—U.S. Pat. No. 9,956,481 to Hisaoka, et al., Based on the Arcomage PC Game (1999) ("Arcomage PC"), In Re.: *Gree, Inc* v. *Supercell OY*, Civil Action No. 2:19-cv-00070-JRG-RSP, Sep. 19, 2019, 104 pages.

Exhibit B-3—Preliminary Invalidity Contentions—U.S. Pat. No. 9,956,481 to Hisaoka, et al., Based on Armageddon Empires Manual (2007) ("Armageddon Empires"), In Re.: *Gree, Inc* v. *Supercell OY*, Civil Action No. 2:19-cv-00070-JRG-RSP, Sep. 19, 2019, 87 pages.

Exhibit B-4—Preliminary Invalidity Contentions—U.S. Pat. No. 9,956,481 to Hisaoka, et al., Based on the Battleforge Manual (2009) ("Battleforge"), In Re.: *Gree, Inc* v. *Supercell OY*, Civil Action No. 2:19-cv-00070-JRG-RSPSep. 19, 2019, 64 pages.

Exhibit B-5—Preliminary Invalidity Contentions—U.S. Pat. No. 9,956,481 to Hisaoka, et al. Based on Battleforge PC Game and Battleforge Manual (2009) ("Battleforge Manual") (collectively, "Battleforge"), In Re.: *Gree, Inc* v. *Supercell OY*, Civil Action No. 2:19-cv-00070-JRG-RSP, Sep. 19, 2019, 65 pages.

Exhibit B-6—Preliminary Invalidity Contentions—U.S. Pat. No. 9,956,481 to Hisaoka, et al., Based on US Patent App. Publication

(56) References Cited

OTHER PUBLICATIONS

No. 2007/202952 to Francis ("Francis"), In Re.: *Gree, Inc* v. *Supercell OY*, Civil Action No. 2:19-cv-00070-JRG-RSP, Sep. 19, 2019, 66 pages.
Exhibit B-7—Preliminary Invalidity Contentions—U.S. Pat. No. 9,956,481 to Hisaoka, et al., Based on Magic the Gathering Instruction Manual (2d. Ed. 1997) ("Magic Instruction Manual"), In Re.: *Gree, Inc* v. *Supercell OY*, Civil Action No. 2:19-cv-00070-JRG-RSP, Sep. 19, 2019, 99 pgs.
Exhibit B-8—Preliminary Invalidity Contentions—U.S. Pat. No. 9,956,481 to Hisaoka, et al. Based on Magic the Gathering PC Game by MicroProse (1997) ("Magic the Gathering PC Game") and Magic the Gathering Instruction Manual (2d. Ed. 1997) ("Magic Instruction Manual") (collectively, "Magic"), In Re.: *Gree, Inc* v. *Supercell OY*, Civil Action No. 2:19-cv-00070-JRG-RSP, Sep. 19, 2019, 149 pages.
Exhibit B-9—Preliminary Invalidity Contentions—U.S. Pat. No. 9,956,481 to Hisaoka, et al., Based on US Patent App. Publication No. 2008/0125220 to Sakaguchi ("Sakaguchi"), In Re.: *Gree, Inc* v. *Supercell OY*, Civil Action No. 2:19-cv-00070-JRG-RSP, Sep. 19, 2019, 67 pgs.
Exhibit B-10—Preliminary Invalidity Contentions—U.S. Pat. No. 9,956,481 to Hisaoka, et al., Based on US Patent Appln Publn No. 2010/0304862 A1 to J. Todd Coleman et al. ("Coleman"), In Re.: *Gree, Inc* v. *Supercell OY*, Civil Action No. 2:19-cv-00070-JRG-RSP, Sep. 19, 2019, 59 pages.
Exhibit B-11—Preliminary Invalidity Contentions—U.S. Pat. No. 9,956,481 to Hisaoka, et al., Based on US Patent Appln Publn No. 2012/0064969 to Tamaki Uchibori ("Uchibori"), In Re.: *Gree, Inc* v. *Supercell OY*, Civil Action No. 2:19-cv-00070-JRG-RSP, Sep. 19, 2019, 72 pages.
Exhibit B-12—Preliminary Invalidity Contentions—U.S. Pat. No. 9,956,481 to Hisaoka, et al., Based on U.S. Pat. No. 5,662,332 to Richard Garfield ("Garfield"), In Re.: *Gree, Inc* v. *Supercell OY*, Civil Action No. 2:19-cv-00070-JRG-RSP, Sep. 19, 2019, 49 pages.
Exhibit B-13—Preliminary Invalidity Contentions—U.S. Pat. No. 9,956,481 to Hisaoka, et al., Based on U.S. Pat. No. 6,554,702 to Shaun Mahar et al. ("Mahar"), In Re.: *Gree, Inc* v. *Supercell OY*, Civil Action No. 2:19-cv-00070-JRG-RSP, Sep. 19, 2019, 59 pages.
Exhibit B-14—Preliminary Invalidity Contentions—U.S. Pat. No. 9,956,481 to Hisaoka, et al., Based on U.S. Pat. No. 9,511,285 to William M. Hawkins, III ("Hawkins"), In Re.: *Gree, Inc* v. *Supercell OY*, Civil Action No. 2:19-cv-00070-JRG-RSP, Sep. 19, 2019, 39 pages.
Exhibit B-15—Preliminary Invalidity Contentions—U.S. Pat. No. 9,956,481 to Hisaoka, et al., Based on US Patent Application Publication No. 2003/0109299 to Hirotaka Reizei ("Reizei"), In Re.: *Gree, Inc* v. *Supercell OY*, Civil Action No. 2:19-cv-00070-JRG-RSP, Sep. 19, 2019, 55 pages.
U.S. Provisional Patent Application Entitled "Spirit Realms: Army, Throne, Barrier, Weapon and Defense Stacking and Stockpiling Trading Card Game", Civil Action No. 2:19-cv-00070-JRG-RSP, Sep. 19, 2019, 62 pages.
End User Manual and Promotional Materials for Arcomage™, The 3DO Company, © 1999, Civil Action No. 2:19-cv-00070-JRG-RSP, Sep. 19, 2019, 9 pages.
Electronic Arts Software End User License Agreement for Battle Forge™, Electronic Arts Inc., © 2009, Civil Action No. 2:19-cv-00070-JRG-RSP, Sep. 19, 2019, 21 pages.
User Directions for game Blink®, Game Designer: Reinhard Staupe, Mattel, Inc., © 2007, Civil Action No. 2:19-cv-00070-JRG-RSP, Sep. 19, 2019, 2 pages.
Digimon Digital Card Battle™ game User's Manual, Bandai America Incorporated, 1997, Civil Action No. 2:19-cv-00070-JRG-RSP, Sep. 19, 2019, 32 pages.
Disney Villanous Game Instructions, Wonder Forge Inc., © 2018, Civil Action No. 2:19-cv-00070-JRG-RSP, Sep. 19, 2019, 6 pages.
Magic The Gathering®, Instruction Manual, MicroProse, © 1997, Civil Action No. 2:19-cv-00070-JRG-RSP, Sep. 19, 2019, 220 pages.
Prima's Official Strategy Guide for Might and Magic® VII For Blood and Honor™, Instruction Manual, The 3DO Company, © 1999, Civil Action No. 2:19-cv-00070-JRG-RSP, Sep. 19, 2019, 8 pages.
Prima's Official Strategy Guide for Might and Magic® VII For Blood and Honor™, Instruction Manual, The 3DO Company, © 1999, Civil Action No. 2:19-cv-00070-JRG-RSP, Sep. 19, 2019, 113 pages.
U.S. Patent Specification entitled, "Virtual Performance System", Civil Action No. 2:19-cv-00070-JRG-RSP, Sep. 19, 2019, 21 pages.
"Armageddon Empires—Can You Rule the Wasteland?" A Post-Apocalyptic Turn Based Strategy Game, User Manual, Cryptic Comet, © 2007, Civil Action No. 2:19-cv-00070-JRG-RSP, Sep. 19, 2019, 58 pages.
Simon Sage, "Magic: The Gathering—Duels of the Planeswalkers for ipad review", Jun. 21, 2012, vol. 4, Civil Action No. 2:19-cv-00070-JRGRSP, Sep. 19, 2019, 7 pages.
USPTO, Before the Patent Trial and Appeal Board, in Re.: *Supercell OY*, Petitioner v. *Gree, Inc.*, Patent Owner, Inter Partes Review No. IPR2019-00754, U.S. Pat. No. 9,604,137: Petitioner's Request for Rehearing Under 37 C.F.R. 42.71 , Sep. 10, 2019, 16 pages.
USPTO, Before the Patent Trial and Appeal Board, in Re.: *Supercell OY*, Petitioner v. *Gree, Inc.*, Patent Owner, Inter Partes Review No. IPR2019-00756, U.S. Pat. No. 9,956,481: Petitioner's Request for Rehearing Under 37 C.F.R. 42.71, Sep. 10, 2019, 16 pages.
USPTO, Before the Patent Trial and Appeal Board, in Re.: *Supercell OY*, Petitioner v. *Gree, Inc.*, Patent Owner, Inter Partes Review No. IPR2019-00754, U.S. Pat. No. 9,604,137: Decision: Denying Petitioner's Request on Rehearing of Decision Denying Institution of Inter Partes Review , Oct. 15, 2019, 13 pages.
USPTO, Before the Patent Trial and Appeal Board, in Re.: *Supercell OY*, Petitioner v. *Gree, Inc.*, Patent Owner, Inter Partes Review No. IPR2019-00756, U.S. Pat. No. 9,956,481: Decision: Denying Petitioner's Request on Rehearing of Decision Denying Institution of Inter Partes Review, Oct. 15, 2019, 13 pages.
In the United States District Court for the Eastern District of Texas Marshall Division, Report and Recommendation in Re.: *Gree, Inc* v. *Supercell OY*, Civil Action No. 2:19-cv-00070-JRG-RSP, Document 102, Jan. 21, 2020, 16 pages.
In the US District Court for the Eastern District of Texas Marshall Division, Defendant's Objection to Report and Recommendation Denying Defendant's Motion to Dismiss in Re: *Gree, Inc.* v. *Supercell OY*, Civil Action No. 2:19-cv-00070-JRG-RSP, Document 103, Feb. 4, 2020, 8 pages.
In the US District Court for the Eastern District of Texas Marshall Division, Gree, Inc.'s Response to Defendant Supercell Oy's Objection to Report and Recommendation Denying Defendant's Motion To Dismiss in Re: *Gree, Inc.* v. *Supercell OY*, Civil Action No. 2:19-cv-00070-JRG-RSP, Document 111, Feb. 18, 2020, 9 pages.
Decision of Refusal dated Mar. 31, 2020 of counterpart Japanese Application No. 2019-030035 with an English translation.
In US District Court for Easter District of Texas Marshall Division, Defendant Supercell OY's Amended Invalidity Contentions and Disclo-sures under Local Patent Rules 3-3 and 3-4 in Re: *Gree, Inc.* v. *Supercell OY*, Civil Action No. 2:19-cv-00070-JRG-RSP, Apr. 2, 2020, 30 pgs.
Baten Kaitos Origins Instruction Booklet, Nintendo of America Inc., © 2006, Civil Action No. 2:19-cv-00070-JRG-RSP, 28 pages.
Court Decision of the Intellectual Property High Court of Japan dated Jun. 4, 2020, in connection with counterpart Japanese Application No. 2018-146350, along with an English summary.
In the United States District Court for the Eastern District of Texas Marshall Division, Redacted version of: Defendant Supercell OY's Motion for Summary Judgment of Invalidity for Failure to Claim Patent-Eligible Subject Matter Under 35 U.S.C. § 101 in Re.: *Gree, Inc* v. *Supercell OY*, Civil Action No. 2:19-cv-00070-JRG-RSP, Document 219, Jun. 10, 2020, 32 pages.
In the United States District Court for the Eastern District of Texas Marshall Division, Plaintiff Gree, Inc.'s Opposition to Defendant Supercell Motion for Summary Judgment of Invalidity for Failure to Claim Patent-Eligible Subject Matter Under 35 U.S.C. § 101 in Re.: *Gree, Inc* v. *Supercell OY*, Civil Action No. 2:19-cv-00070-JRG-RSP, Document 244, Jun. 22, 2020, 29 pages.

(56) References Cited

OTHER PUBLICATIONS

In the United States District Court for the Eastern District of Texas Marshall Division, Redacted version of: Defendant Supercell OY's Reply in Support of Motion for Summary Judgment of Invalidity for Failure to Claim Patent-Eligible Subject Matter Under 35 U.S.C. § 101 in Re.: *Gree, Inc* v. *Supercell OY*, Civil Action No. 2:19-cv-00070-JRG-RSP, Document 291, Jul. 2, 2020, 8 pages.
1996 manual for Magic: The Gathering—Battlemage, accessed Mar. 29, 2020 from https://www.gamesdatabase.org/Media/SYSTEM/Sony_Playstation/Manual/formated/Magic-_The_Gathering_-_Battlemage_-_1996_-_Acclaim Entertainment.pdf, 14 pages, SUPERCELL_PA_00009270-SUPERCELL_PA_00009283.
Notice of Reasons for Refusal dated May 31, 2016 of counterpart Japanese Application No. 2013-200439 with English translation.
Notice of Reasons for Rejection dated May 16, 2017 of counterpart Japanese Application No. 2017-028605 with English translation.
Notice of Reasons for Rejection dated Aug. 8, 2017 of counterpart Japanese Application No. 2017-028605 with English translation.
Decision of Refusal dated Jan. 9, 2018 of counterpart Japanese Application No. 2017-214261 with English translation.
Decision of Rejection dated Nov. 27, 2018 of counterpart Japanese Application No. 2018-146350 with English translation.
USPTO, Before the Patent Trial and Appeal Board in Re: *Supercell OY*, Petitioner v. *Gree, Inc.*, Patent Owner, Inter Partes Review No. IPR2019-00754: Petition for Inter Partes Review of U.S. Pat. No. 9,604,137, including Exhibits 1001 to 1013, Mar. 1, 2019.
USPTO, Before the Patent Trial and Appeal Board in Re: *Supercell OY*, Petitioner v. *Gree, Inc.*, Patent Owner, Inter Partes Review No. IPR2019-00756: Petition for Inter Partes Review of U.S. Pat. No. 9,956,481, including Exhibits 1001 to 1013, Mar. 1, 2019.
Magic: The Gathering—Instruction Manual, MicroProse, 1997.
An introductory movie of the online game "CARTE," YouTube, [online], [video], Mar. 1, 2012, [accessed on Aug. 17, 2018], Internet<URL, https://www.youtube.com/watch?y=uCe5J7ES1-g>.
Notice of Reasons for Rejection dated Aug. 28, 2018 of counterpart Japanese Application No. 2018-146350 with English translation.
Notice of Reasons for Rejection dated Apr. 23, 2019 of counterpart Japanese Application No. 2019-030035 with English translation.
Trial and Appeal Decision dated May 14, 2019 of counterpart Japanese Application No. 2018-146350 with English translation.
In the United States District Court for the Eastern District of Texas Marshall Division, Defendant Supercell OY's Motion to Dismiss in Re: *Gree, Inc.* v. *Supercell OY*, Civil Action No. 2:19-cv-00070-JRG-RSP, Document 17, May 16, 2019.
In the United States District Court for the Eastern District of Texas Marshall Division, Notice of Compliance with Standing Order Regarding Motions Under 35 U.S.C. §101 in Re: *Gree, Inc.* v. *Supercell OY*, Civil Acton No. 2:19-cv-00070-JRG-RSP, Document 22, Jun. 4, 2019.
In the United States District Court for the Eastern District of Texas Marshall Division, Exhibit 1, Document 22-1, in Re: *Gree, Inc.* v. *Supercell OY*, Civil Action No. 2:19-cv-00070-JRG-RSP, Jun. 4, 2019.
USPTO, Before the Patent Trial and Appeal Board in Re: *Supercell OY*, Petitioner v. *Gree, Inc.*, Patent Owner, Inter Partes Review No. IPR2019-00754: Patent Owner's Preliminary Response, U.S. Pat. No. 9,604,137, Jun. 11, 2019.
USPTO, Before the Patent Trial and Appeal Board in Re: *Supercell OY*, Petitioner v. *Gree, Inc.*, Patent Owner, Inter Partes Review No. IPR2019-00756: Patent Owner's Preliminary Response, U.S. Pat. No. 9,956,481, Jun. 11, 2019.
In the United States District Court for the Eastern District of Texas Marshall Division, Document22-I, in Re: *Gree, Inc.* v. *Supercell OY*, Civil Action No. 2:19-cv-00070-JRG-RSP, Patent Owner Gree, Inc.—Exhibit 2001, Jun. 4, 2019.
Notice of Reasons for Refusal dated Aug. 6, 2019 of counterpart Japanese Application No. 2019-030035 with English translation.
In the US District Court for the Eastern District of Texas Marshall Division, Defendant Supercell Oy's Reply in Support of Its Motion To Dismiss in Re: *Gree, Inc* v. *Supercell OY*, Civil Action No. 2:19-cv-00070-JRG- RSP, Document 27, Jun. 24, 2019.
In the US District Court for the Eastern District of Texas Marshall Division, Plaintiff Gree, Inc.'S Sur-Reply To Defendant Supercell Oy's Reply in Support of Its Motion to Dismiss in Re: *Gree, Inc* v. *Supercell OY*, Civil Action No. 2:19-cv-00070-JRG-RSP, Document 32, Jul. 1, 2019.
In the United States District Court for the Eastern District of Texas Marshall Division, Exhibit 2006 in Re: *Gree, Inc* v. *Supercell OY*, Civil Action No. 2:19-cv-00070-JRG-RSP.
USPTO, Before the Patent Trial and Appeal Board, in Re: *Supercell OY*, Petitioner v. *Gree, Inc.*, Patent Owner, Inter Partes Review No. IPR2019-00754: Petitioners Reply to Patent Owners Preliminary Response, U.S. Pat. No. 9,604,137, Jul. 2, 2019.
USPTO, Before the Patent Trial and Appeal Board, in Re: *Supercell OY*, Petitioner v. *Gree, Inc.*, Patent Owner, Inter Partes Review No. IPR2019-00756: Petitioners Reply to Patent Owners Preliminary Response, U.S. Pat. No. 9,956,481, Jul. 2, 2019.
USPTO, Before the Patent Trial and Appeal Board, in Re: *Supercell OY*, Petitioner v. *Gree, Inc.*, Patent Owner, Inter Partes Review No. IPR2019-00754: Patent Owner's Preliminary Sur-Reply, U.S. Pat. No. 9,604,137, Jul. 2, 2019.
USPTO, Before the Patent Trial and Appeal Board, in Re: *Supercell OY*, Petitioner v. *Gree, Inc.*, Patent Owner, Inter Partes Review No. IPR2019-00756: Patent Owner's Preliminary Sur-Reply, U.S. Pat. No. 9,956,481, Jul. 9, 2019.
USPTO, Before the Patent Trial and Appeal Board, in Re: *Supercell OY*, Petitioner v. *Gree, Inc.*, Patent Owner, Inter Partes Review No. IPR2019-00754: Decision: Denying Institution of Inter Partes Review, U.S. Pat. No. 9,604,137, Aug. 12, 2019.
USPTO, Before the Patent Trial and Appeal Board, in Re: *Supercell OY*, Petitioner v. *Gree, Inc.*, PatentOwner, Inter Partes Review No. 1PR2019-00756: Decision: Denying Institution of Inter Partes Review, U.S. Pat. No. 9,956,481, Aug. 12, 2019.
In Re Japanese Patent Application No. 2019-30035: Submission of Publications dated Sep. 27, 2019 with English machine translation.
In Re Japanese Patent Application No. 2018-146350: Submission of Publications dated Oct. 7, 2019 with English machine translation.
In Re Japanese Patent Application No. 2013-200439: Submission of Publications dated Oct. 7, 2019 with English machine translation.
In Re Japanese Patent Application No. 2013-042162: Submission of Publications dated Oct. 7, 2019 with English machine translation.
In Re Japanese Patent Application No. 2013-177713: Submission of Publications dated Oct. 7, 2019 with English machine translation.
In Re Japanese Patent Application No. 2017-028605: Submission of Publications dated Oct. 7, 2019 with English machine translation.
In Re Japanese Patent Application No. 2017-214261: Submission of Publications dated Oct. 7, 2019 with English machine translation.
Notice of Reasons for Refusal dated Dec. 3, 2019 of counterpart Japanese Patent Application No. 2019-030035 with English translation.
Kadokawa Game Linkage, Inc., "Forbidden Summoning Summon Master' is finally released. Become a summoner and defend the enemies," available online at URL:https://app.famitsu.com/20130108-1197371, Jan. 8, 2018, 16 pages, with English machine translation.
Impress Corporation, "Bushiroad booth report," available online at <URL:https://game.watch.impress.co.jp/docs/news/561306.html> Nov. 21, 2019, 17 pages, with English machine translation.
Axel Games home reproduction video, entitled "forbidden summons summon master play video," available online at URL:https://www.youtube.com/watch?v =_ P-MzlzDijs> and indicated as published on Jan. 20, 2013. The video, 200 pages.
Natopin video, entitled "Summon Master Mugen," available online at <https://www.youtube.com/watch?v=x9FOgajaorY> and indicated as published on Apr. 11, 2014. The video, 124 pages.
In US District Court for Eastern District of Texas Marshall Division, Defendant Supercell Oy's Invalidity Contentions and Disclosures Under Local Patent Rules 3-3 and 3-4 in Re: *Gree, Inc* v. *Supercell OY*, Civil Action No. 2:19-cv-00070-JRG-RSP, Doc. 024, Sep. 19, 2019, 29 pgs.
Exhibit A-1—Preliminary Invalidity Contentions—U.S. Pat. No. 9,604,137 to Hisaoka, et al. Based on Arcomage Manual (1999) ("Arcomage Manual") and Prima's Official Strategy Guide: Might

(56) References Cited

OTHER PUBLICATIONS and Magic VII for Blood and Honor (1999) ("Might and Magic VII Guide") (collectively, "Arcomage"), In Re.: *Gree, Inc* v. *Supercell OY*, Civil Action No. 2:19-cv-00070-JRG-RSP, Sep. 19, 2019, 70 pages.
Exhibit A-2—Preliminary Invalidity Contentions—U.S. Pat. No. 9,604,137 to Hisaoka, et al. Based on the Arcomage PC Game (1999) ("Arcomage PC"), In Re.: *Gree, Inc* v. *Supercell OY*, Civil Action No. 2:19-cv-00070-JRG-RSP, Sep. 19, 2019, 89 pages.
Exhibit A-3—Preliminary Invalidity Contentions—U.S. Pat. No. 9,604,137 to Hisaoka, et al. Based on Armageddon Empires Manual (2007) ("Armageddon Empires"), In Re.: *Gree, Inc* v. *Supercell OY*, Civil Action No. 2:19-cv-00070-JRG-RSP, Sep. 19, 2019, 74 pages.
Exhibit A-4—Preliminary Invalidity Contentions—U.S. Pat. No. 9,604,137 to Hisaoka, et al. Based on the Battleforge Manual (2009) ("Battleforge"), In Re.: *Gree, Inc* v. *Supercell OY*, Civil Action No. 2:19-cv-00070-JRG-RSP, Sep. 19, 2019, 54 pages.
Exhibit A-5—Preliminary Invalidity Contentions—U.S. Pat. No. 9,604,137 to Hisaoka, et al. Battleforge PC Game and Battleforge Manual (2009) ("Battleforge Manual") (collectively, "Battleforge"), In Re.: *Gree, Inc* v. *Supercell OY*, Civil Action No. 2:19-cv-00070-JRG-RSP, Sep. 19, 2019, 57 pages.
Exhibit A-6—Preliminary Invalidity Contentions—U.S. Pat. No. 9,604,137 to Hisaoka, et al. Based on US Patent App. Publication No. 2007/202952 to Francis ("Francis"), In Re.: *Gree, Inc* v. *Supercell OY*, Civil Action No. 2:19-cv-00070-JRG-RSP, Sep. 19, 2019, 56 pages.
Exhibit A-7—Preliminary Invalidity Contentions—U.S. Pat. No. 9,604,137 to Hisaoka, et al. Based on Magic the Gathering Instruction Manual (2d. Ed. 1997) ("Magic Instruction Manual"), In Re.: *Gree, Inc* v. *Supercell OY*, Civil Action No. 2:19-cv-00070-JRG-RSP, Sep. 19, 2019, 86 pages.
Exhibit A-8—Preliminary Invalidity Contentions—U.S. Pat. No. 9,604,137 to Hisaoka, et al. Based on Magic the Gathering PC Game by MicroProse (1997) ("Magic the Gathering PC Game") and Magic the Gathering Instruction Manual (2d. Ed. 1997) ("Magic Instruction Manual") (collectively, "Magic"), In Re.: *Gree, Inc* v. *Supercell OY*, Civil Action No. 2:19-cv-00070-JRG-RSP, Sep. 19, 2019, 122 pages.
In the United States District Court for the Eastern District of Texas Marshall Division, in Re.: *Gree, Inc* v. *Supercell OY*, Civil Action No. 2: 19-cv-00070-JRG-RSP: Instruction Manual for "Arcomage", The 3DO Company, @1999, 9 pages.
In the United States District Court for the Eastern District of Texas Marshall Division, in Re.: *Gree, Inc* v. *Supercell OY*, Civil Action No. 2:19-cv-00070-JRG-RSP: BattleForge User Manual, Electronic Arts, Inc., © 2009, 21 pages.
In the United States District Court for the Eastern District of Texas Marshall Division, in Re.: *Gree, Inc* v. *Supercell OY*, Civil Action No. 2: 19-cv-00070-JRG-RSP: Baten Kaitos Origins Instruction Booklet, Nintendo of America Inc., © 1995, 28 pages.
In the United States District Court for the Eastern District of Texas Marshall Division, in Re.: *Gree, Inc* v. *Supercell OY*, Civil Action No. 2: 19-cv-00070-JRG-RSP: Magic: The Gathering Instruction Manual, by MicroProse, © 1997, 220 pages.
Notice of Reasons for Rejection dated Dec. 20, 2016 of counterpart Japanese Application No. 2013-200439 with English translation.
In the United States District Court for the Eastern District of Texas Marshall Division, Redacted Expert Report of Stacy Friedman in Re.: *Gree, Inc* v. *Supercell OY*, Civil Action No. 2:19-cv-00070-JRG-RSP, May 4, 2020, 448 pages.
In the United States District Court for the Eastern District of Texas Marshall Division, Redacted Rebuttal Expert Report of Dr. Robert Akl. D.S.C. Regarding Validity of U.S. Pat. Nos. 9,604,137; 9,956,481; 9,774,655; and 9,795,873 in Re.: *Gree, Inc* v. *Supercell OY*, Civil Action No. 2:19-cv-00070-JRG-RSP, May 26, 2020, 232 pages.
Sep. 24, 2007 Article "Practical Approach to Slow Play," accessed via the internet from https://magic.wizards.com/en/articles/archive/practical-approach-slow-play-2007-09-24, SUPERCELL_PA_00010664-SUPERCELL_PA00010670.
English translation of Japanese Patent JP 2001-137534 A, with images, published May 22, 2001, SUPERCELL_PA_00010647-SUPERCELL_PA_00010663.
Arcomage, 1999, New World Computing, The 3DO Company—YouTube.com—channel, accessed via the internet from https://www.youtube.com/channel/UCEuZMVIIpgKar8eOiVpWvHeA, 2 pages, SUPERCELL_PA_00010643-SUPERCELL_PA_00010644.
Release Information for Arcomage accessed via the internet from https://www.mobygames.com/game/windows/arcomage/release-info, Copyright © 1999-2009, Mobygames, 1 page, SUPERCELL-PA00010411-SUPERCELL-PA00010411.
BK 2006 Gamestop.com—GC—Buy New and Used GameCube Games, accessed via the internet from https://www.gamestop.com/default.asp?/cookie_test=1&sect=1161, 2 pages, SUPERCELL_PA00010399-SUPERCELL_PA00010400.
BK 2006 EBgames.com—Electronics Boutique—New & Used Games—Home, accessed via the internet from https://www.ebgames.com/default.asp?sect=1277, 2 pages, SUPERCELL_PA00010391-SUPERCELL_PA00010392.
Battleforge manual-English (2009), 21 pages, Webpage listing card types for Trade & Battle: Card Hero, accessed Mar. 28, 2020 from https://gamefags.gamespot.com/gbc/576989-card-hero-trading-and-battle/faqs/68869. SUPERCELL_PA_00010368-SUPERCELL_PA_00010388.
Armageddon Empires Manual Copyright © 2007, Cryptic Comet, 58 pages, SUPERCELL_PA00010310-SUPERCELL_PA00010367.
Arcomage—Manual, Copyright © 1999, The 3DO Company, 9 pages, SUPERCELL_PA00010300-SUPERCELL_PA00010308.
2010 BattleForge—PC MMO RTS—EA Games, accessed via the internet from https://web.archive.org/web/20100310171150/http://www.ea.com:80/games/battleforge, 2 pages, SUPERCELL-PA00010294-SUPERCELL-PA00010295.
2009 BattleForge—PC MMO RTS—EA Games, accessed via the internet from https://web.archive.org/web/20090325011908/http://www.ea.com:80/games/battleforge, 2 pages, SUPERCELL-PA00010286-SUPERCELL-PA00010287.
2009 BattleForge for Windows—MobyGames, accessed via the internet from https://web.archive.org/web/20090416054653/https://www.mobygames.com/game/windows/battleforge, 3 pages, SUPERCELL-PA00010277-SUPERCELL-PA00010279.
2009 Battleforge EBGames.com—PC—Buy PC Games, accessed via the internet from https://web.archive.org/web/20090328083649/http://www.ebgames.com:80/pcgames, 2 pages, SUPERCELL-PA00010272-SUPERCELL-PA00010273.
2007 Magic—The Gathering for Windows—MobyGames, accessed via the internet from https://web.archive.org/web/20070303092946/https://www.mobygames.com/game/windows/magic-the-gathering, 2 pages, Supercell-PA00010266-SUPERCELL-PA00010267.
2007 Baten Kaitos Origins for GameCube—MobyGames, accessed May 3, 2020 at https://www.mobygames.com/game/gamecube/baten-kaitos-origins, 3 pages, SUPERCELL-PA00010254-SUPERCELL-PA00010256.
1998 MicroProse Games—Magic—The Gathering, accessed via the internet from https://web.archive.org/web/19981203090139/http://www.microprose.com/gamesdesign/magic/magic.html, 2 pages, SUPERCELL-PA00010246-SUPERCELL-PA00010247.
Jan. 20, 2013 Internet Archive snapshot of the Pagat.com webpage on Cuttle, accessed Mar. 28, 2020 from https://web.archive.org/web/20130120185354/https://www.pagat.com/combat/cuttle.html, 4 pages, SUPERCELL_PA00010234-SUPERCELL_PA_00010237.
Jan. 17, 2013 Internet Archive snapshot of the Wikipedia article on Yahtzee, accessed Mar. 29, 2002 from https://web.archive.org/web/20130117150809/https://en.wikipedia.org/wiki/Yahtzee, 11 pages, SUPERCELL_PA_00010223-SUPERCELL_PA_00010233.
Nov. 8, 2012 Internet Archive snapshot of the Wikipedia article on the Card Battle Video Games category, accessed Mar. 26, 2020 from https://web.archive.org/web/20121108191155/https://en.wikipedia.org/wiki/Category:Card_battle_video_games, 2 pages, SUPERCELL_PA_00010221-SUPERCELL_PA_00010222.
Feb. 18, 2012 Internet Archive snapshot of the BoardGameGeek.com article on the Action Point Allowance System, accessed Mar. 26, 2020 from https://web.archive.org/web/20120218024055/http://

(56) References Cited

OTHER PUBLICATIONS boardgamegeek.com/boardgamemechanic/2001/action-point-allowance-system, 3 pages, SUPERCELL_PA_00010218-SUPERCELL_PA_00010220.

Jan. 9, 2008 Internet Archive snapshot of the Wikipedia article on the Nintendo Game Link Cable, accessed Mar. 28, 2020 from https://web.archive.org/web/20080109125016/https://en.wikipedia.org/wiki/Game_Link_Cable, 3 pages, SUPERCELL_PA_00010215-SUPERCELL_PA_00010217.

Feb. 9, 2007 Hasbro press release announcing Magic Online III PC game, accessed Apr. 30, 2020 from https://web.archive.org/web/20070219002850/http://www.hasbro.com/media/default.cfm?page=release&release=539, 3 pages, SUPERCELL_PA_00010212-SUPERCELL_PA_00010214.

Trade & Battle—Card Hero—Wikipedia, the free encyclopedia, accessed via the internet on Mar. 27, 2020, from https://web.archive.org/web/20080120082035/https:/en.wikipedia.org/wiki/Trade_%26_Battle:_Card_Hero, 3 pages, Supercell-PA00010190-SUPERCELL-PA00010192.

Sep. 24, 2012, Royal Revolt!—Universal—HD Gameplay Trailer, accessed via the internet at https://youtube.com/watch?v=dTufwTrVMpY, 5 pages, SUPERCELL-PA00010169-SUPERCELL-PA00010173.

Oct. 23, 2012, Royal Revolt—Official Google Play Trailer, accessed via the internet at https://www.youtube.com/watch?v=u4O8JRligJU, 4 pages, SUPERCELL-PA00010164-SUPERCELL-PA00010167.

Magic-the-Gathering-Battlegrounds—Atari Instruction Manual, 2003, 16 pages, SUPERCELL-PA00010138-SUPERCELL-PA00010153.

Magic—The Gathering Tactics—Wikipedia, the free encyclopedia, accessed via the internet from https://web.archive.org/web/20120207143312/http://en.wikipedia.org/wiki/Magic:_The_Gathering_-_Tactics, 3 pages, SUPERCELL-PA00010135-SUPERCELL-PA00010137.

Magic—The Gathering Duels of the Planeswalkers—Wikipedia, the free encyclopedia, accessed via the internet from https://web.archive.org/web/20111012063358/http://en.wikipedia.org/wiki/Magic:_The_Gathering_-_Duels_of_the_Planeswalkers, 5 pages, SUPERCELL-PA00010130-SUPERCELL-PA00010134.

Magic—The Gathering Online—Wikipedia, the free encyclopedia, accessed via the internet from https://web.archive.org/web/20120617083813/http://en.wikipedia.org/wiki/Magic:_The_Gathering_Online, 7 pages, SUPERCELL-PA00010123-SUPERCELL-PA00010129.

Tal Blevins, Magic—The Gathering—BattleMage Review—GameSpot, May 1, 2000 article on Magic: The Gathering—Battlemage, accessed Mar. 29, 2020 from https://www.gamespot.com/reviews/magic-the-gathering-battlemage-review/1900-2542419/, 4 pages, SUPERCELL_PA_00010119-SUPERCELL_PA_00010122.

Magic-The-Gathering-Battlemage-1996—Acclaim-Entertainment, 14 pages, SUPERCELL-PA00010105-SUPERCELL-PA00010118.

Magic the Gathering—Battlegrounds Review—IGN, 8 pages, Dec. 2003 article on Magic: the Gathering—Battlegrounds, accessed Mar. 29, 2020 from https://www.ign.com/articles/2003/12/04/magic-the-gathering-battlegrounds-review, SUPERCELL_PA_00010097-SUPERCELL_PA_00010104.

Hasbro Magic Online III—release, Feb. 9, 2007, accessed via the internet from http://www.hasbro.com/media/default.cfm?page=release&release=539, 3 pages, SUPERCELL-PA00010084-SUPERCELL-PA00010086.

Frank Caron, EA's casual, card-based RTS sounds terrible, plays amazingly—Ars Technica, Sep. 2, 2008, article on BattleForge, accessed Mar. 29, 2020 from https://arstechnica.com/gaming/2008/09/eas-casual-card-based-rts-sounds-terrible-plays-amazingly/, 6 pages, SUPERCELL_PA_00010072-SUPERCELL_PA_00010077.

Mar. 24, 2000 article about Trade & Battle: Card Hero, accessed Mar. 28, 2020 from https://www.ign.com/articles/2000/03/24/card-hero, 8 pages, SUPERCELL_PA_00010019-SUPERCELL_PA_00010026.

BattleForge Gameplay [HD]—Sep. 22, 2011, accessed via the internet on Mar. 29, 2020 from https://www.youtube.com/watch?v=GuzR9fk8Fis, 3 pages, SUPERCELL-PA00010001-SUPERCELL-PA00010003.

2001 manual for UNO, accessed on Mar. 29, 2020 from https://service.mattel.com/instruction_sheets/42001pr.pdf, 2 pages, SUPERCELL_PA_00009985-SUPERCELL_PA_00009986.

Jan. 20, 2008 Internet Archive snapshot of the Wikipedia article on Trade & Battle: Card Hero, accessed Mar. 26, 2020 from https://web.archive.org/web/20080120082035/https://en.wikipedia.org/wiki/Trade_%26_Battle:_Card_Hero, 3 pages, SUPERCELL_PA_00009358-SUPERCELL_PA_00009360.

2002 Nintendo Gamecube broadband adapter instruction booklet, accessed Apr. 24, 2020 from https://www.nintendo.com/consumer/downloads/broadband_english.pdf., SUPERCELL_PA_00009338-SUPERCELL_PA_00009339.

2003 manual for Magic: The Gathering—Battlegrounds, accessed Mar. 29, 2020 from https://www.gamesdatabase.org/Media/SYSTEM/Microsoft_Xbox//Manual/formated/Magic_the_Gathering_-_Battlegrounds_-_Atari.pdf, 16 pages, SUPERCELL_PA_00009315-SUPERCELL_PA_00009330.

Feb. 7, 2012 Internet archive of the Wikipedia page on Magic: The Gathering—Tactics, accessed Apr. 30, 2020 from https://web.archive.org/web/20120207143312/http://en.wikinedia.org/wiki/Magic:The_Gathering_%E2%80%93_Tactics, 2 pages, SUPERCELL_PA_00009299-SUPERCELL_PA_00009300.

Oct. 12, 2011 Internet archive of the Wikipedia page on Magic: The Gathering—Duels of the Planeswalkers, accessed Apr. 30, 2020 from https//web.archive.org/web/20111012063358/http://en.wikipedia.org/wiki/Magic:The_Gathering_%E2%80%93_Duels_of_the_Planeswalkers, 4 pages, SUPERCELL_PA_00009295-SUPERCELL_PA00009298.

Jun. 17, 2012 Internet archive of the Wikipedia page on Magic: The Gathering Online, accessed Apr. 30, 2020 from https://web.archive.org/web/20120617083813/http://en.wikipedia.org/wiki/Magic:The_Gathering_Online, 7 pages, SUPERCELL_PA_00009285-SUPERCELL_PA_00009291.

In the United States District Court for the Eastern District of Texas Marshall Division, Plaintiff Gree, Inc.'s Sur-Reply in Opposition to Supercell's Motion for Summary Judgment of Invalidity for Failure to Claim Patent-Eligible Subject Matter Under 35 U.S.C. § 101 in Re.: *Gree, Inc* v. *Supercell OY*, Civil Action No. 2:19-cv-00070-JRG-RSP, Document 317, Jul. 8, 2020, 9 pages.

In the United States District Court for the Eastern District of Texas Marshall Division, Exhibit 1, Document 22-I, in Re: *Gree, Inc*. v. *Supercell OY*, Civil Action No. 2:19-cv-00070-JRG-RSP, Jun. 4, 2019.

USPTO, Before the Patent Trial and Appeal Board in Re: *Supercell OY*, Petitioner v. *Gree, Inc.*, PatentOwner, Inter Partes Review No. IPR2019-00756: Decision: Denying Institution of Inter Partes Review, U.S. Pat. No. 9,956,481, Aug. 12, 2019.

\* cited by examiner

SERVER, CONTROL METHOD THEREFOR, COMPUTER-READABLE RECORDING MEDIUM, AND GAME SYSTEM

RELATED APPLICATIONS

This is a continuation of U.S. Ser. No. 16/902,427, filed Jun. 16, 2020, entitled "Server, control method therefor, computer-readable recording medium, and game system," which is a continuation of and claims priority to U.S. Ser. No. 16/427,523, now U.S. Pat. No. 10,974,141, filed May 31, 2019, which is a continuation of and claims priority to U.S. Ser. No. 15/943,867, now U.S. Pat. No. 10,960,305, filed Apr. 3, 2018, which is a continuation of and claims priority to U.S. Ser. No. 15/391,157, now U.S. Pat. No. 9,956,481, filed Dec. 27, 2016, which is a continuation of and claims priority to U.S. Ser. No. 14/929,738, now U.S. Pat. No. 9,604,137, filed Nov. 2, 2015, which is a continuation of and claims priority to U.S. Ser. No. 14/194,466, now U.S. Pat. No. 9,205,337, filed Feb. 28, 2014, which is based on JP 2013-042162, filed Mar. 4, 2013, JP 2013-177713, filed Aug. 29, 2013, and JP 2013-200439, filed Sep. 26, 2013, the contents of which are incorporated herein by reference.

TECHNICAL FIELD

This disclosure relates to a server, a control method therefor, a computer-readable recording medium, and a game system.

BACKGROUND

JP 2001-137534 A describes a card game device in which characters (called masters or the like) as player characters operated by players make a battle with each other on a game screen of a portable game machine using character cards that form a so-called deck. JP 2008-220984 A describes a kind of role-playing game in which the game progresses while characters are playing a card battle using a deck according to a predetermined story. JP 4693936 describes an example of a battle game between baseball teams consisting of players assigned to virtual trading cards in a server-client system.

In deck battle games including the above-mentioned conventional games, players or characters (hereinafter simply called "players") play a card battle using character cards as a general rule. In this regard, a player selects a finite number of character cards (deck characters) that make an own deck from among multiple character cards (e.g., character cards as items possessed by the player) prepared beforehand as the game setting. At this time, for example, the player can check on or predict the personality (such as strength and favorite moves (favorite and signature skills one is good at)) of an enemy character or an opponent player to create an arbitrary and desired combination of own deck characters.

In such conventional games, however, once a deck (a set of deck characters) is created, the deck formation cannot be changed in one battle event (also called a quest or a turn). Then, an attack against an enemy character or an opponent character through the fixed deck is automatically made. As a result, the player can do nothing but select a character card in the battle event as a primary interesting element of the game, or the player can only do very monotonous work such as to continuously hit a button or a switch to instruct, for example, an attack against the enemy character or the opponent character.

Further, it is so set that the kind and strength of the attack against the enemy character or the opponent character are generally determined according to the kind, personality, attribute, and level of each of the characters that form the deck. On the other hand, since the deck formation is fixed and cannot be changed as mentioned above, even when two or more attacks are possible during one battle event, attack variations are limited. Therefore, there are problems that the battle event itself becomes stereotyped, and in some cases, that a player can predict the result (win or loss) of a battle to some degree when a deck is formed.

As a result, the interest in and real enjoyment of the battle event and hence the entire game are reduced or lost, causing a problem of being unable to urge players to participate in the game or drive their motivations to continue the game.

It could therefore be helpful to elicit the originality and ingenuity of players to improve the interest in and taste of a battle event that was monotonous work in conventional products. It could also be helpful to provide a server capable of providing a game that can raise players' motivation to participate in the game or continue the game, and that can amplify or increase the interest in and real enjoyment of the entire game, a control method therefor, a program, and a game system.

SUMMARY

We thus provide:

(1) A non-transitory computer-readable recording medium recording a program that causes a computer, which is connected to a terminal device operated by a player through a communication line, to provide a game including a predetermined battle event comprising at least one battle, and is accessible to an information storage unit storing, as part of information related to the game, information on plural kinds of player characters and at least one kind of enemy character associated with the predetermined battle event, information on a game content corresponding to the player characters, information on a second parameter value for each of the player characters and/or each of the game contents, information on a third parameter value for the battle or the predetermined battle event, and information on a fourth parameter value for each of the player characters and/or each of the enemy characters, to perform steps of:

accessing the information, performing computation on the game, and displaying images of the game on the terminal device;

displaying a plurality of the game contents in a first field on the terminal device so that the player can select at least one desired game content from the plurality of the game contents to attack the enemy character in the predetermined battle event;

displaying the corresponding fourth parameter value together with at least one of the player character and the enemy character;

when the player selects the desired game content from the game contents displayed in the first field, removing the game content selected by the player from the first field, and updating the first field with a new game content alternative to the removed game content;

sequentially subtracting the second parameter value of the selected game content from the third parameter value; and, adding a predetermined amount to the third parameter value or restoring the third parameter value at appropriate timing.

(2) A control method for a server connected to a terminal device operated by a player through a communication line to provide a game including a predetermined battle event comprising at least one battle, the server including an information storage unit for storing information related to the game, and a control unit for accessing the information, performing computation on the game, and displaying images of the game on the terminal device, the method comprising:

storing, in the information storage unit, as part of information related to the game, information on plural kinds of player characters and at least one kind of enemy character associated with the predetermined battle event, information on a game content corresponding to the player characters, information on a second parameter value for each of the player characters and/or each of the game contents, information on a third parameter value for the battle or the predetermined battle event, and information on a fourth parameter value for each of the player characters and/or each of the enemy characters;

causing the control unit to display a plurality of the game contents in a first field on the terminal device so that the player can select at least one desired game content from the plurality of the game contents to attack the enemy character in the predetermined battle event, displaying the corresponding fourth parameter value together with at least one of the player character and the enemy character, when the player selects the desired game content from the game contents displayed in the first field, removing the game content selected by the player from the first field, and updating the first field with a new game content alternative to the removed game content, sequentially subtracting the second parameter value of the selected game content from the third parameter value; and, adding a predetermined amount to the third parameter value or restoring the third parameter value at appropriate timing.

(3) A server connected to a terminal device operated by a player through a communication line to provide a game including a predetermined battle event comprising at least one battle, comprising:

an information storage unit for storing information related to the game; and a control unit for accessing the information, performing computation on the game, and displaying images of the game on the terminal device, wherein the information storage unit storing, as part of information related to the game, information on plural kinds of player characters and at least one kind of enemy character associated with the predetermined battle event, information on a game content corresponding to the player characters, information on a second parameter value for each of the player characters and/or each of the game contents, information on a third parameter value for the battle or the predetermined battle event, and information on a fourth parameter value for each of the player characters and/or each of the enemy characters, the control unit displays a plurality of the game contents in a first field on the terminal device so that the player can select at least one desired game content from the plurality of the game contents to attack the enemy character in the predetermined battle event, displays the corresponding fourth parameter value together with at least one of the player character and the enemy character, when the player selects the desired game content from the game contents displayed in the first field, removes the game content selected by the player from the first field, and updates the first field with a new game content alternative to the removed game content, sequentially subtracts the second parameter value of the selected game content from the third parameter value; and, adds a predetermined amount to the third parameter value or restoring the third parameter value at appropriate timing.

(4) A terminal device comprising:

a storage unit that stores, as part of information related to a game, (i) information on plural kinds of character cards in which a point for selecting a character and plural parameters are predetermined, (ii) information on a character in association with the character card, and (iii) information on point amount for selecting a character;

a display processing unit that displays the plural character cards in a first field in a state of being arranged adjacent to one another, and among the character cards displayed in the first field, that displays in a manner selectable by a player of the game the character card with a point equal to or less than a point amount that increases as time passes; and a control unit that removes the selected character card from the first field, arranges or sends an instruction to arrange the character corresponding to the selected character card in a second field different from the first field, and displays the new character card in the first field as a substitute for a removed character card, wherein the display unit displays a new point amount obtained by subtracting the point amount by the point of the selected character card; and the character corresponding to the selected character card attacks an enemy character in the second field based on the plural parameters associated with the selected character card, and the character card with the point equal to or less than the new point amount is selectable by the player.

(5) The terminal device according to (4), wherein the set of the plural character cards displayed in the first field at a first timing can be different from the set of the plural character cards displayed in the first field at a second timing different from the first timing.

(6) The terminal device according to (4), wherein a gauge that indicates change in the point amount is displayed.

(7) The terminal device according to (4), wherein the plural character cards include a first character card and a second character card, a rapidity set to the first character card is larger than a rapidity set to the second character card, and the point of the first character card is smaller than the point of the second character card.

(8) The terminal device according to (4), wherein the display unit displays the point of the character card in the first field.

(9) The terminal device according to (4), wherein the control unit removes the selected character card from the first field, and then displays in the second field in a state different from that in the first field.

(10) A method of controlling a computer connected to another computer through a communication line to provide a game including a battle event, the method comprising:

storing, as part of information related to a game, (i) information on plural kinds of character cards in which a point for selecting a character and plural parameters are predetermined, (ii) information on a character in association with the character card, and (iii) information on point amount for selecting a character;

causing a display processing unit to display the plural character cards in a first field in a state of being arranged adjacent to one another;

among the character cards displayed in the first field, causing a display unit to display in a manner selectable by a player of the game the character card with a point equal to or less than a point amount that increases as time passes;

causing a control unit to remove the selected character card from the first field, arrange or send an instruction to arrange the character corresponding to the selected character card in a second field different from the first field, and display the new character card in the first field as a substitute of a removed character card; and causing the display unit to display a new point amount obtained by subtracting the point amount by the point of the selected character card, wherein the character corresponding to the selected character card attacks an enemy character in the second field based on the plural parameters associated with the selected character card, and the character card with the point equal to or less than the new point amount is selectable by the player.

(11) A non-transitory computer readable recording medium that records a program causing the computer to perform steps of:

storing, as part of information related to a game, (i) information on plural kinds of character cards in which a point for selecting a character and plural parameters are predetermined, (ii) information on a character in association with the character card, and (iii) information on point amount for selecting a character;

causing a display processing unit to display the plural character cards in a first field in a state of being arranged adjacent to one another;

among the character cards displayed in the first field, causing a display unit to display in a manner selectable by a player of the game the character card with a point equal to or less than a point amount that increases as time passes;

causing a control unit to remove the selected character card from the first field, arrange or send an instruction to arrange the character corresponding to the selected character card in a second field different from the first field, and display the new character card in the first field as a substitute of the removed character card; and causing the display unit to display the new point amount obtained by subtracting the point amount by the point of the selected character card, wherein the character corresponding to the selected character card attacks an enemy character in the second field based on the plural parameters associated with the selected character card, and the character card with the point equal to or less than the new point amount is selectable by the player.

(12) A terminal device comprising:

a storage unit that stores, as part of information related to a game, (i) information on plural kinds of character cards in which a point for selecting a character and plural parameters are predetermined, (ii) information on a character in association with the character card, and (iii) information on a point amount for selecting a character;

a display processing unit that displays the plural character cards in a first field in a state of being arranged adjacent to one another and in a manner such that the character card with the point equal to or less than the point amount is selectable by a player of the game;

a control unit that sends an instruction to remove the selected character card from the first field, to arrange the character corresponding to the selected character card in a second field different from the first field, and to display a new character card in the first field as substitute of the removed character card;

wherein, when a player selects the character card, the point amount is subtracted by the point of the selected character card and the character card with the point equal to or less than the renewed point amount is selectable by the player;

plural character cards in the first field are selectable at a single operation of the player; and the character corresponding to the selected character card is configured to attack an enemy character in the second field based on the plural parameters associated with the selected character card.

(13) A method of controlling a computer connected to another computer through a communication line to provide a game including a battle event, the method comprising:

storing, as part of information related to a game, (i) information on plural kinds of character cards in which a point for selecting a character and plural parameters are predetermined, (ii) information on a character in association with the character card, and (iii) information on point amount for selecting a character;

causing a display processing unit to display the plural character cards in a first field in a state of being arranged adjacent to one another and in a manner such that the character card with the point equal to or less than the point amount is selectable by a player of the game;

causing a control unit that sends an instruction to remove the selected character card from the first field, to arrange the character corresponding to the selected character card in a second field different from the first field, and to display a new character card in the first field as the substitute of the removed character card; and when a player selects the character card, subtracting the point amount by the point of the selected character card, and the character card with the point equal to or less than the renewed point amount being selectable by the player, wherein plural character cards in the first field are selectable at a single operation of the player, and the character corresponding to the selected character card is configured to attack an enemy character in the second field based on the plural parameters associated with the selected character card.

(14) A non-transitory computer readable recording medium that records a program causing the computer to perform steps of:

storing, as part of information related to a game, (i) information on plural kinds of character cards in which a point for selecting a character and plural parameters are predetermined, (ii) information on a character in association with the character card, and (iii) information on point amount for selecting a character;

causing a display processing unit to display the plural character cards in a first field in a state of being arranged adjacent to one another and in a manner such that the character card with the point equal to or less than the point amount is selectable by a player of the game;

causing a control unit that sends an instruction to remove the selected character card from the first field, to arrange the character corresponding to the selected character card in a second field different from the first field, and to display a new character card in the first field as the substitute of the removed character card; and when a player selects the character card, subtracting the point amount by the point of the selected character card, and the character card with the point equal to or less than the renewed point amount, wherein plural character cards in the first field are selectable at a single operation of the player, and the character corresponding to the selected character card is configured to attack an enemy character in the second field based on the plural parameters associated with the selected character card.

DESCRIPTION OF REFERENCE NUMERALS

Figure 1:
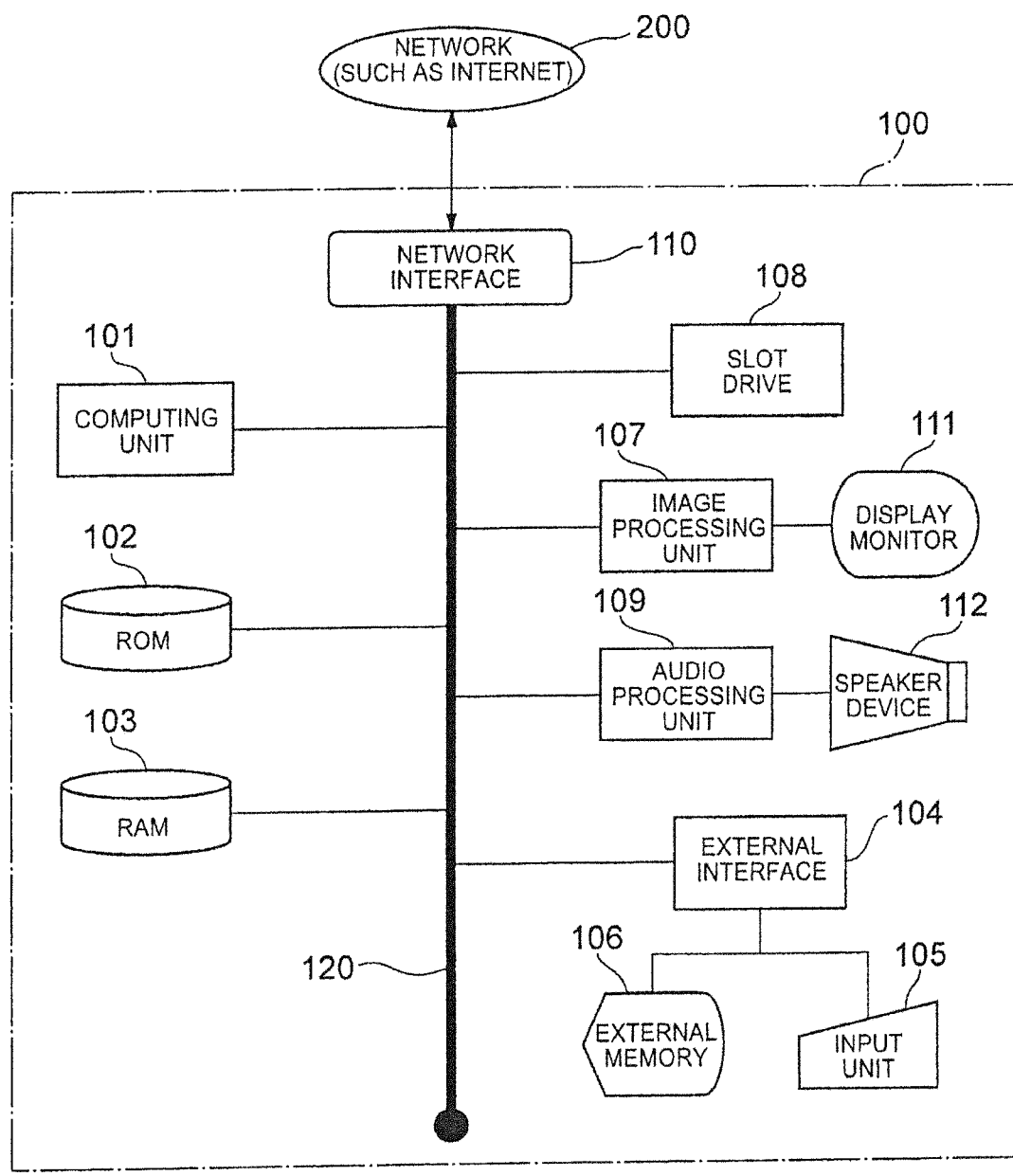
FIG. 1 is a schematic block diagram (system block diagram) showing a preferred example of a server.

1: game system
2: terminal device
2a: screen
7: finger
8: geometric figure (indication of number of attacks)
21: client computer (terminal device)
22: mobile terminal (terminal device)
61: AP gauge
62: HP gauge
100: server
101: computing unit (control unit)
102: ROM (information storage unit)
103: RAM (information storage unit)
104: external interface
105: input unit
106: external memory
107: image processing unit
108: slot drive
109: audio processing unit
110: network interface
111: display monitor
112: speaker device
120: transmission path
200: network (communication line)
A31, B32, C33, D34, E35: character card
A41, C43: selected character card
AP: action point
Ca, Cb, Cc, Cd, Ce: player character
D1 to D5: selection indication
Ea, Eb, Ec: enemy character
Fb: battle field (second field)
Fe: event field
Fp: palette (first field)
HP: hit point
S1 to S10: step
Tu: turn
Y1 to Y7: selection candidate indication
X1 to X5: skill exercise indication

DETAILED DESCRIPTION

We provide a server first connected to a terminal device operated by a player (game user, client) through a communication line to provide a game including a predetermined battle event. Further, the server includes an information storage unit that stores information related to the game, and a control unit that accesses the information, performs computation on the game, and displays images of the game on the terminal device.

Then, the information storage unit holds, as part of the information related to the game, plural kinds of player characters associated with the predetermined battle event, at least one kind of enemy character (opponent character), and information on a game content corresponding to each of the player characters (representing the player character). Further, the control unit displays multiple game contents in a first field on the terminal device so that the player can select at least one desired game content from the multiple game contents to attack the enemy character in the predetermined battle event. Further, when the player selects the desired game content from the game contents displayed in the first field, the control unit removes the game content selected by the player from the first field (which may be erased from the display screen of the terminal device, or moved to and displayed in an area other than the first field such as a second field to be described later). Furthermore, the control unit updates (refills) the first field with a new game content alternative to the removed game content.

Note that the "game contents" denote contents or items capable of being held and managed by the player during the game. For example, the "game contents" include character cards, avatars, and figures corresponding to player characters to be handled in virtual game space, which is a concept including so-called "objects." Further, the "game contents" may evoke player characters directly or indirectly (such as the names of player characters, nominal designations thereof, weapons, clothes, costumes, spells, magic, moves, or associated characters). The "game contents" may be displayed as still images or moving images, or as mere character information rather than the images. In some cases, the "game contents" may not be visually recognizable or may be recognizable through the auditory sense alone such as audio information.

The player can connect the terminal device to the server configured as such through the communication line to play the game including the predetermined battle event online or offline. During the game, the control unit included in the server accesses the information related to the game and stored in the information storage unit. Then, the control unit can perform various computations on the game using the information to make the game progress along the settings while displaying game images as the computational results on the terminal device as game screens.

In the predetermined battle event of the game, multiple game contents corresponding to player characters are displayed in the first field on (the display screen of) the terminal device as a result of processing performed by the control unit. The player can select a desired game content from the multiple game contents to attack the enemy character. Further, the game content selected by the player is removed from the first field, and the first field is updated (refilled) with a new game content instead as needed.

Thus, candidates for a game content to be selected by the player to attack the enemy character using a player character are once displayed in the first field. From among them, the player can appropriately select a game content to be actually used to attack the enemy character. Then, since the first field is updated with a new game content as needed, the player can further additionally select, from the first field, a game content to be used to attack the enemy character. As a result, a set of game contents selected by the player (a stack or combination of game contents to attack the enemy character, which corresponds to the "deck formation" in the conventional, for example) is no longer settled and fixed in the battle event. In other words, the set (deck) of game contents can be changed in one predetermined battle event sequentially and desirably at the player's discretion. Therefore, the player's intention and determination are reflected in the result of the win or loss of the battle event. The set (deck) of game contents selected by the player from the first field can be called a variable deck or a non-fixed deck in terms of being able to be selected arbitrarily from the palette Fp.

More specifically, the information storage unit further holds information on a first parameter value (amount) set for each of the player characters and/or each of the game contents as part of the information related to the game. It is also preferred that, when updating (refilling) the first field with a new game content alternative to the game content removed from the first field, the control unit should determine the kind of updated game content (corresponding player character) based on the first parameter value.

In this case, in view of the fact that a player character and a game content corresponding to the player character are associated with the battle event, the following can be exemplified as "first parameters" (kinds of parameter rather than values): the rapidity of each player character (the quickness or rapidity of an action or an attack), an action point(s) (AP) of each individual player character or multiple player characters, health point or vitality (hit point; HP), attack power to the enemy character, and the strength of a move that can be used by each player character. Note that "based on the first parameter value" includes not only when the kind of updated game content is uniformly determined by the first parameter value, but also when the kind of updated game content is determined according to an occurrence probability weighted using the magnitude of the first parameter value.

This makes it easy for the player to predict (expect) the kind of updated new game content to some extend compared to when the new game content updated to the first field is determined arbitrarily (at random). Thus, for example, when selecting desired game contents from the first field to form a deck, the player can develop an operation or strategy to defeat the enemy character effectively and purposely according to various attributes and the like set depending on the kinds of game contents. As a result, the discretion of the player in the battle event can be increased, and the player's intention and determination can be clearly reflected depending on the result of the win or loss of the battle event.

More specifically, the information storage unit holds, as part of the information related to the game, information on a second parameter value set for each of the player characters and/or each of the game contents, and information on a third parameter value set for the predetermined battle event. It is also preferred that, when the sum (total amount) of second parameter values of the game contents selected by the player is less than or equal to an upper limit of the third parameter value, the control unit should permit the player to select these game contents. In other words, the upper limit of the third parameter value as the total cost available for selecting desired game contents from the first field (to form a deck) is first assigned to (set for) each player (user) participating in the battle event. Then, if the sum (total amount) of second parameter values each of which is an individual consumption cost set for each of the player characters and/or each of the game contents is less than or equal to the available total cost (the upper limit of the third parameter value), the player can select desired game contents to form a deck. For example, when the predetermined battle event can be composed of multiple matches called "turns," the third parameter value set for the predetermined battle event can also be set for each turn.

As these "second parameters" and "third parameters" (kinds of parameters rather than values), those similar to the "first parameters" mentioned above are exemplified. In other words, the rapidity of each player character (the quickness or rapidity of an action or an attack), an action point(s) (AP) of each individual player character or multiple player characters, health point or vitality (hit point; HP), attack power to the enemy character, and the strength of a move that can be used by each player character can be exemplified (but not limited) as "second parameters" and "third parameters." Further, the "second parameters" may be the same as or different from the "first parameters" and/or the "third parameters" Likewise, the "third parameters" may also be the same as or different from the "first parameters" and/or the "second parameters."

This will require the player to compare the sum of second parameter values set for selected game contents with the upper limit of the third parameter value to fall the sum within the upper limit (available total cost) of the third parameter value. In other words, the player is required to select a set of game contents to make an attack on the enemy character while managing the second parameter value and the upper limit of the third parameter value. As a result, for example, the battle event can be prevented from becoming monotonous due to facile selection of only the game content of a player character that allows the player to give more damage to the enemy character. This can put psychological and intellectual loads on the player, further increasing the discretion of the player in the battle event.

Further, in this case, the control unit may sequentially subtract the second parameter value of the game content selected by the player from the third parameter value, and add a predetermined amount to the third parameter value at appropriate timing or restore the upper limit of the third parameter value. The "appropriate timing" is not particularly limited. For example, as mentioned above, when the predetermined battle event is composed of multiple matches (turns), the upper limit of the third parameter value may be restored as time passes in the middle of each turn. Alternatively, the upper limit of the third parameter value may be restored based on the damage given by the player character to the enemy character. Instead of or in addition to this, compiled values as the third parameter value may be restored at the start or end of the turn.

Further, the information storage unit may hold, as part of the information related to the game, information on plural kinds of moves that allow each of the player characters to attack the enemy character and are different from one another in terms of damage given to the enemy character. When there are multiple game contents selected by the player and the multiple game contents include ones corresponding to the same player character, the control unit may be configured as follows, namely: A specific move can be determined from plural kinds of moves that can be used by the same player character according to numerical quantities of the game contents corresponding to the same player character to give damage to the enemy character using the specific move determined.

In such a configuration, for example, the player can select game contents corresponding to the same player character purposely without a break to exercise (throw) a different special move (e.g., special move) over (at) the enemy character in addition to moves normally used by the player character (normal moves). In other words, a game element different from the selection of game contents by the player is added in one battle event. This significantly increases the variations of operation or strategy for the player to defeat the enemy character, further increasing the discretion of the player.

Further, the control unit may display, in the first field, a state where multiple game contents are arranged adjacent to one another (a kind of aligned state). In this case, after removing a game content selected by the player from the first field, the control unit can rearrange the game contents remaining in the first field to move over or fill a region where the removed game content was arranged. The control unit may further update (refill) the region (blank region) caused by the rearrangement with a new game content to display the remaining game contents and the updated new game content in a state of being arranged adjacent to one another. In this case, the control unit may display (dynamically display) the movement of the game contents (so-called "fade-in" or "slide-in") using moving images.

In addition, the control unit may redisplay the game content selected by the player in a second field different from the first field in a state identical to or different from the state of being displayed in the first field. For example, the selected game content may be redisplayed in a mode easy to confirm a player character of the game content selected by the player.

Further, a control method for a server is a method of effectively controlling the server mentioned above. In other words, the control method is a control method for a server connected to a terminal device operated by a player through a communication line to provide a game including a predetermined battle event, the server including an information storage unit that stores information related to the game, and a control unit that accesses the information, performs computation on the game, and displays images of the game on the terminal device.

Then, in this method, plural kinds of player characters associated with the predetermined battle event, at least one kind of enemy character, and information on a game content corresponding to each of the player characters are first stored in the information storage unit as part of the information related to the game. The control unit displays multiple game contents in a first field on the terminal device so that the player can select at least one desired game content from the multiple game contents to attack the enemy character in the predetermined battle event. Then, when the player selects the desired game content from the game contents displayed in the first field, the game content selected by the player is removed from the first field. Further, the first field is updated with a new game content alternative to the removed game content.

Further, a program establishes a connection to a terminal device operated by a player through a communication line to provide a game including a predetermined battle event. Specifically, the program causes a computer to execute the following steps, where the computer is accessible to an information storage unit for storing, as part of information related to the game, plural kinds of player characters associated with the predetermined battle event, at least one kind of enemy character, and information on a game content corresponding to each of the player characters.

Namely, the steps include the following steps of:
accessing the information, performing computation on the game, and displaying images of the game on the terminal device;
displaying multiple game contents in a first field on the terminal device so that the player can select at least one desired game content from the multiple game contents to attack the enemy character the enemy character in the predetermined battle event;
when the player selects the desired game content from the game contents displayed in the first field, removing the game content selected by the player from the first field; and
updating the first field with a new game content alternative to the removed game content.

Furthermore, a game system includes a terminal device operated by a player and a server connected to the terminal device through a communication line to provide a game including a predetermined battle event. In other words, the game system includes an information storage unit that stores information related to the game, and a control unit that accesses the information, performs computation on the game, and displays images of the game on the terminal device.

Then, like the server, the information storage unit holds, as part of the information related to the game, plural kinds of player characters associated with the predetermined battle event, at least one kind of enemy character, and information on a game content corresponding to each of the player characters. Further, the control unit displays multiple game contents in a first field on the terminal device so that the player can select at least one desired game content from the multiple game contents to attack the enemy character in the predetermined battle event. When the player selects the desired game content from the game contents displayed in the first field, the control unit further removes the game content selected by the player from the first field. Then, the control unit updates the first field with a new game content alternative to the removed game content.

The player can appropriately select a game content corresponding to a player character used to attack an enemy character in a battle event. Since a new game content alternative to the game content selected by the player is updated as needed, a set of game contents selected by the player can be changed sequentially and desirably at the player's discretion. Therefore, the originality and ingenuity of the player in the battle event can be elicited to improve the interest in and taste of the battle event that was monotonous work in the conventional. As a result, the player is urged to participate in the game or the player's motivation is driven to continue the game and, hence, the interest in and real enjoyment of the entire game can be amplified or increased.

An example will now be described in detail below. Note that the example below is intended to be only by way of example to describe our server, method, medium and game system, and this disclosure is not limited to the example alone. Various modifications can be made without departing from the scope of the appended claims. Further, those skilled in the art can adopt any other example in which each component or element to be described below is replaced with an equivalent one, and such an example is included in the scope of this disclosure. Positional relations such as left, right, top, and bottom, indicated as needed are based on those shown in the drawings unless otherwise noted. Note further that various dimension ratios in the drawings are not limited to the dimension ratios shown. To facilitate the understanding, the following description will take, as an example, one example is carried out by using a game information processing apparatus, but this disclosure is not limited thereto as mentioned above.

Figure 2:
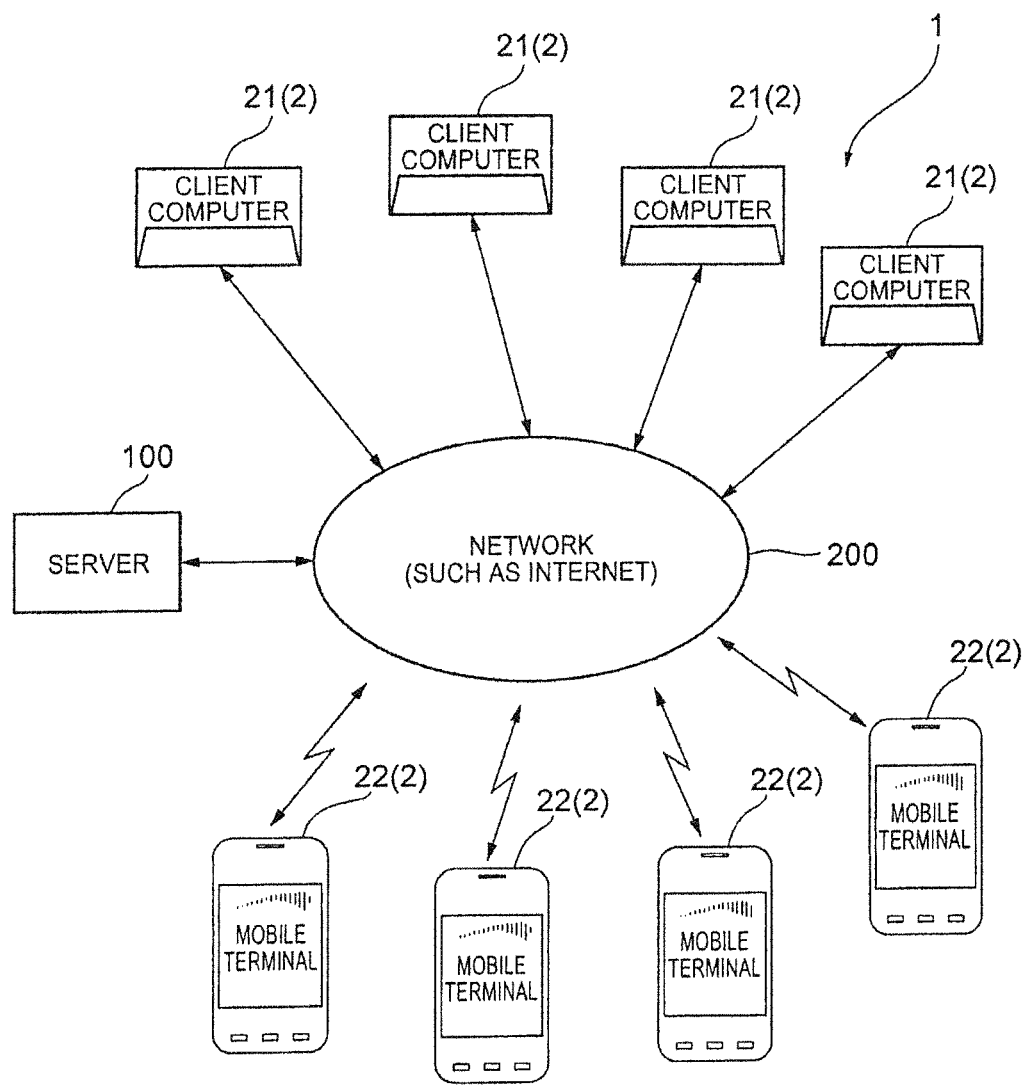
FIG. 2 is a schematic block diagram (system configuration diagram) showing one preferred example of a game system.

FIG. 1 is a schematic block diagram (system block diagram) showing one preferred example of a server. FIG. 2 is a schematic block diagram (system configuration diagram) showing one preferred example of our game system. As shown in these figures, a server 100 is a server computer connected to a network 200 as a communication line or a communication network relating to information processing such as the Internet. A predetermined server program is run on the server computer to fulfill a server function. Further, the server 100 and terminal devices 2 such as client computers 21 and mobile terminals 22, connected by wire and/or wireless to the network 200 are set up to be communicable with one another to configure a game system 1.

The server 100 includes a computing unit 101 such as a CPU or an MPU, a ROM 102 and a RAM 103 as storage devices, and an external interface 104 to which an input unit 105 and an external memory 106 are connected. The server 100 also includes an image processing unit 107 to which a display monitor 111 is connected, a slot drive 108 into or to which a disk or a memory device is loaded or connected, an audio processing unit 109 to which a speaker device 112 is connected, and a network interface 110. Then, these components connect to one another through a transmission path 120 such as a system bus, including, for example, an internal bus, an external bus, and an expansion bus. Note that devices responsible for input/output of the input unit 105, the external memory 106, the display monitor 111, and the speaker device 112 may be omitted appropriately as needed. Further, these devices may not always be connected to the transmission path 120.

The computing unit 101 controls the entire operation of the server 100 not only to exchange control signals and information signals (data) with the other components mentioned above, but also to perform various arithmetic processing necessary to execute a game. Therefore, the computing unit 101 can perform, in a fast-accessible storage area such as a so-called register, arithmetic operations such as addition, subtraction, multiplication and division using an arithmetic logical unit or the like, logical operations such as logical OR, logical AND, and logical NOT, and bitwise operations such as bitwise OR, bitwise AND, bitwise invert, bitwise shift, and bitwise rotate. The computing unit 101 can also perform as needed a saturation calculation, a trigonometric function calculation, a vector operation, and the like.

An IPL (Initial Program Loader) first executed after power-on is generally recorded in the ROM 102. This IPL is executed so that the computing unit 101 will read a server program and a game program once into the RAM 103 to execute the program, where the program is recorded on a disk or in a memory device loaded in or connected to the slot drive 108. An operating system program necessary to control the entire operation of the server 100 and other various data are recorded in the ROM 102.

The RAM 103 is to store the server program, the game program, and various data temporarily. In addition to the server program and game program read as mentioned above, data necessary to the progress of the game and communication between two or more terminal devices 2 are held in the RAM 103. The computing unit 101 sets a variable area in the RAM 103. The computing unit 101 also performs direct operations using the arithmetic logical unit on values stored in the variable area, or the computing unit 101 once copies or moves the values stored in the RAM 103 to the register to perform direct operations on the register as well. Further, the computing unit 101 performs processing for writing these operation results back to the RAM 103.

The input unit 105 connected through the external interface 104 is to accept various operations input by a user (game provider) of the server 100. As the input unit 105, a voice input unit can be employed as well as a keyboard, a touch pad, and a touch panel. Note that the kind of device as the input unit 105 is not particularly limited as long as the device can input instructions such as various operations, a confirmation operation, a cancel operation, and the display of a menu.

Rewritably stored in the RAM 103 and the external memory 106, removably connected through the external interface 104, are data indicative of the operating conditions of the server 100, the access status of each terminal device 2, and the game playing conditions and the stages of progress (the results in the past, and the like) on each terminal device 2, log (record) data on communication between terminal devices 2, and the like.

The image processing unit 107 processes the various data read from the slot drive 108 by the computing unit 101 or by itself, and records processed image information in a frame memory or the like. The image information recorded in this frame memory is converted to a video signal at predetermined synchronization timing, and output to the display monitor 111 connected to the image processing unit 107. This enables various images to be displayed. Further, in cooperation with the computing unit 101, image information on a game is sent from the image processing unit 107 and/or the computing unit 101 to each terminal device 2.

The audio processing unit 109 converts the various data read from the slot drive 108 into audio signals, and outputs the audio signals from the speaker device 112 connected to the audio processing unit 109. Further, in cooperation with the computing unit 101, audio information on the game (sound effects and music information) is sent from the audio processing unit 109 and/or the computing unit 101 to each terminal device 2.

The network interface 110 is to connect the server 100 to the network 200. The network interface 110 includes, for example, an analog modem, an ISDN modem, or an ADSL modem, which conforms to each standard used in establishing a LAN, a cable modem for connection to the Internet using a cable TV line, and the like. The network interface 110 may also include an interface for connecting these to the computing unit 101 through the transmission path 120.

Figure 3:
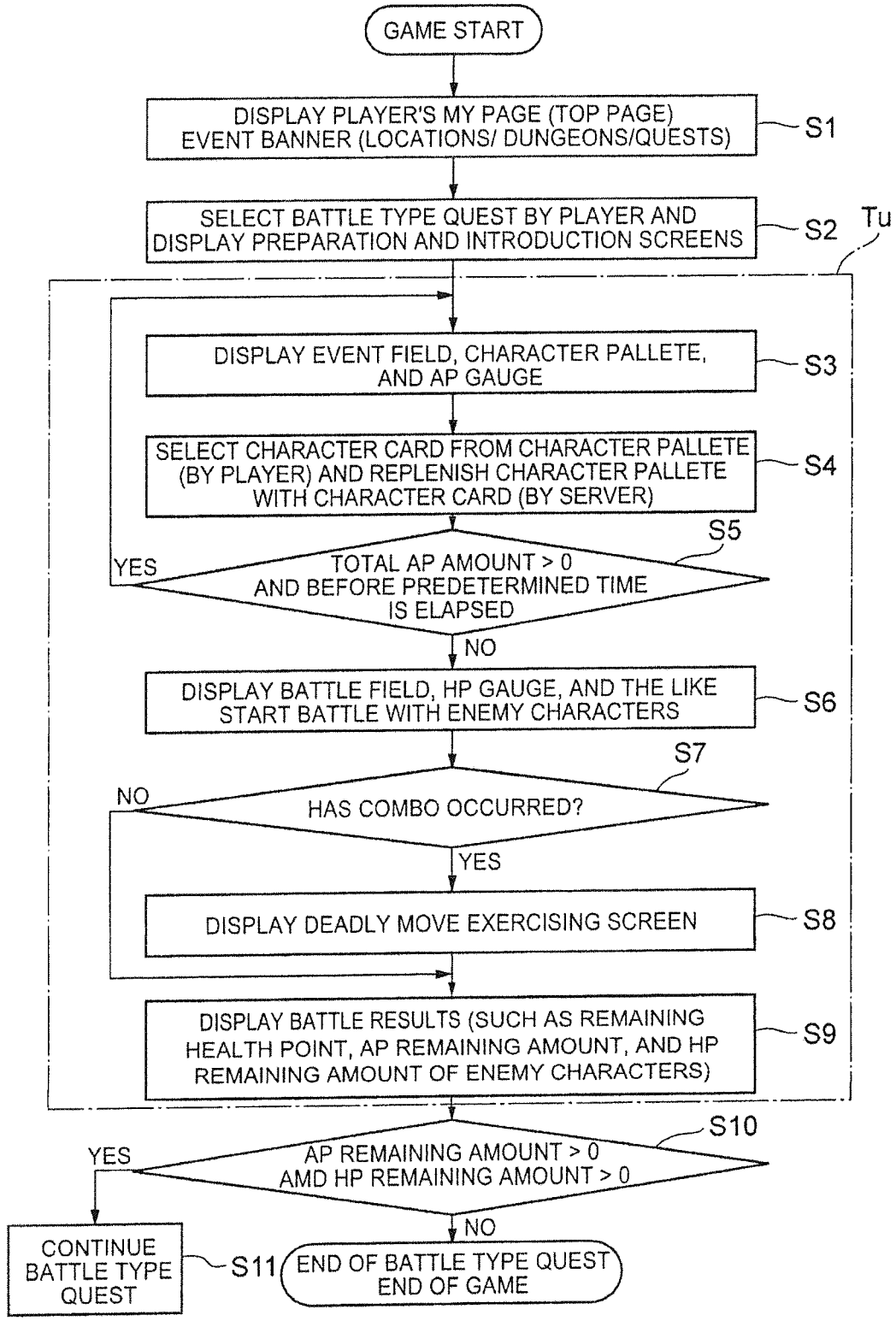
FIG. 3 is a flowchart showing part of a game procedure performed on the server shown in FIGS. 1 and 2.
Figure 4:
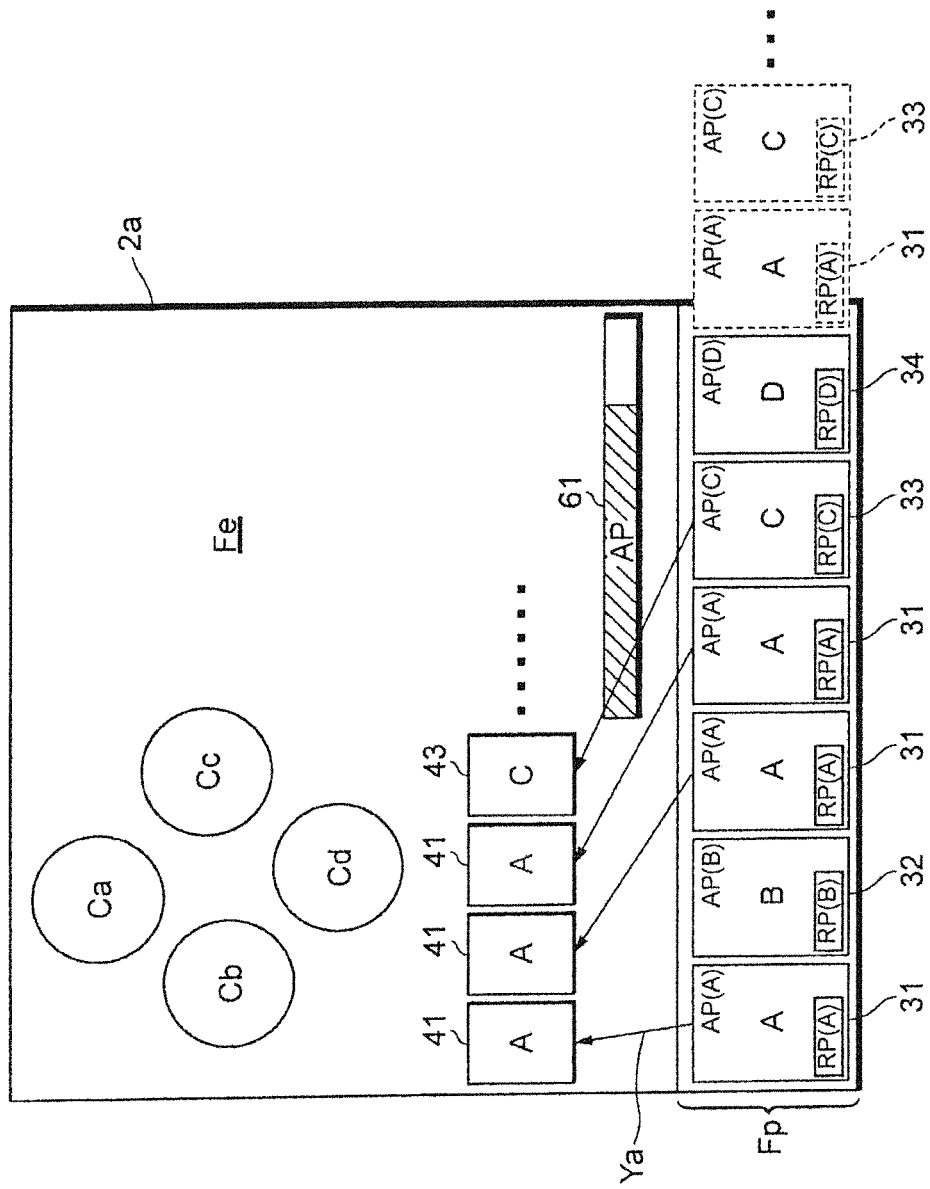
FIG. 4 is a schematic view showing a configuration example of a game screen in part of the game procedure shown in FIG. 3.
Figure 5:
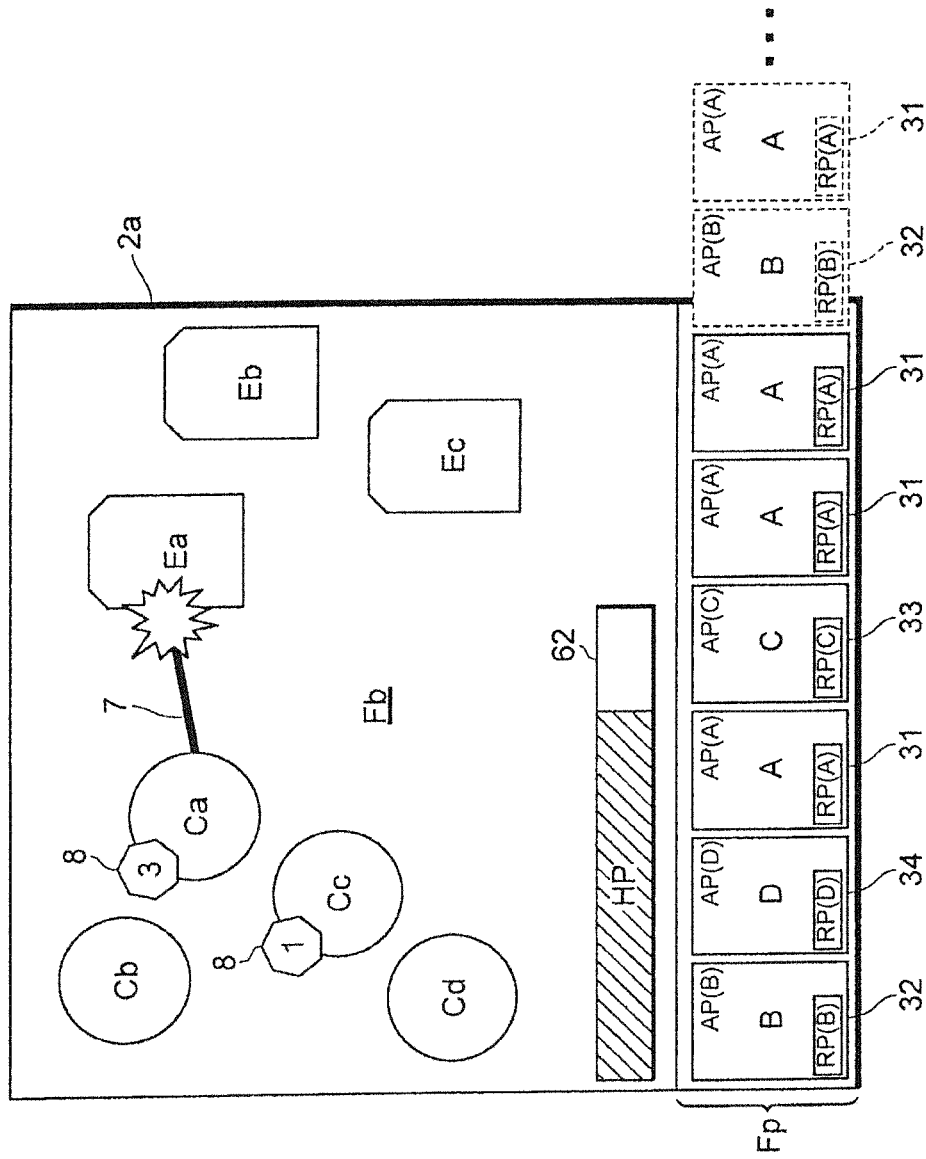
FIG. 5 is a schematic view showing the configuration example of the game screen in part of the game procedure shown in FIG. 3.

A preferred example of a game implemented in the game system 1 configured as such and the server 100 according to a game program will be described below. FIG. 3 is a flowchart showing part of a game procedure performed on the server 100, particularly showing a flow focused on the evolution of a game screen to be displayed on a terminal device 2 operated by a player. FIG. 4 and FIG. 5 are schematic views showing configuration examples of game screens in some parts of the game procedure shown in FIG. 3.

Note that various processing (image or screen display, determination, calculation, and the like) in the procedure mentioned below is performed based on control instructions from the computing unit 101 of the server 100. In other words, the computing unit 101 functions as a "control unit." Further, various storage media with game information recorded thereon in addition to the ROM 102, the RAM 103, and the external memory 106 mentioned above correspond to an "information storage unit."

Example of Basic Game Progression

A player first operates a terminal device 2 (a client computer 21 or a mobile terminal 22, or a tablet terminal or a smartphone) to connect the terminal device 2 to the server 100 through the network 200 such as the Internet. The player further operates the terminal device 2 to select a game provided from the server 100 or enter login information such as an ID number or a personal identification number on a platform screen before the selection of the game. When recognizing the login information, the computing unit 101 of the server 100 displays, on the terminal device 2, my page unique to the player associated with the ID number (step S1). In this game example, a banner listing multiple scenes (e.g., locations, dungeons, quests) set as game scenes is displayed on the my page screen. These scenes such as locations, dungeons, or quests may be hierarchized as mutual or individual structures, or may not be hierarchized.

Next, for example, when the player selects a battle type quest (a predetermined battle event) from the list of multiple scenes displayed on the terminal device 2, a preparation screen for the battle type quest is displayed on the terminal device 2. Further, when the preparation for the selected battle type quest is completed in the computing unit 101, an introduction screen thereof is displayed on the terminal device 2 (step S2). The display of the battle type quest preparation screen and the introduction screen may be a still image or a moving image, and a flash or the like can also be used. Then, the computing unit 101 performs processing on a turn Tu (a step group surrounded by a dashed-dotted line in FIG. 3) set for the battle type quest.

Further description will be made while referring to FIGS. 4 and 5 as well. As a procedure of processing this turn Tu, an event field Fe and a palette Fp (character palette) are first defined on a screen 2 $a$ of the terminal device 2 as display areas of game images to display respective constituent elements in these display areas. In the example, player characters Ca to Cd (ally characters) represented by solid circles are displayed in the event field Fe as some of the constituent elements. Further, the palette Fp is a kind of "field" for displaying, as the constituent elements, character cards A31, B32, C33, and D34 respectively corresponding to the player characters Ca to Cd (respectively representing the player characters Ca to Cd). In other words, the palette Fp corresponds to a "first field," and the character cards A31, B32, C33, and D34 correspond to "game contents."

FIG. 4 shows a layout example of the multiple character cards A31, B32, C33, and D34 at the start of a certain turn Tu. In the palette Fp of the screen 2 $a$ at this time, those character cards selected or determined as characters to be used in the battle event by the player or the computing unit 101 (game system) of the server 100 are displayed. In this example, a display area for six cards is defined for four kinds of character cards in the palette Fp, and three character cards A31, and one each of character cards B32, C33, and D34 are displayed. These are represented by solid rectangles in FIG. 4 and displayed in a state of being arranged adjacent to one another (a state of being aligned). Note that one each of character cards A31 and C33 represented by dashed rectangles as shown are scheduled to be newly filled afterward, and displayed here in the same drawing for convenience.

A numeric value of "rapidity" (quickness) unique to each of the player characters Ca to Cd is preset as a first parameter value in each of the character cards A31, B32, C33, and D34, respectively. Each of the rapidities RP(A), RP(B), RP(C), and RP(D) of the character cards A31, B32, C33, and D34 is displayed on the screen 2 $a$ in a mode identifiable by the player. The display mode of the "rapidity" is not particularly limited. For example, it may be a numeric value or the display of a geometric figure different in size, length, or numerical quantity.

This "rapidity" determines the frequency (probability) of appearance of each of the character cards A31, B32, C33, and D34 in the palette Fp. Based on the values of these rapidities RP(A), RP(B), RP(C), and RP(D), the computing unit 101 performs arithmetic processing such, for example, that the appearance frequency of a character card corresponding to a player character the rapidity of which is relatively high will be high. The player can select a desired character card from the character cards A31, B32, C33, and D34 displayed on the screen 2 $a$ as mentioned above.

A numeric value of "action point: AP" unique to each of the player characters Ca to Cd is also preset in each of the character cards A31, B32, C33, and D34. Each of the action point values is displayed on the screen 2 $a$ as AP(A), AP(B), AP(C), and AP(D) for each of the character cards A31, B32, C33, and D34 in a mode identifiable by the player. Further, the total amount of action point AP (total AP amount) consumable in this turn Tu is set.

The action point unique to each of the player characters Ca to Cd represents the magnitude of damage that can be given by a normal move (normal or ordinary skill) used for an enemy character in a manner to be described later. In the example, though not particularly limited, the action points AP(A), AP(B), AP(C), and AP(D) unique to the player characters Ca to Cd are set to correlate with the rapidities RP(A), RP(B), RP(C), and RP(D) unique to the player characters Ca to Cd mentioned above. For example, a player character having relatively high rapidity RP (i.e., quicker player character) has a higher probability of appearing in the palette Fp but the action point AP thereof is set smaller. On the other hand, a player character having relatively low rapidity RP (i.e., slower player character) has a lower probability of appearing in the palette Fp but the action point AP thereof is set larger. In other words, it is difficult for a player character with relatively low rapidity RP to appear until player characters with relatively high rapidities RP appear many times, and are selected and used by the player.

Then, when the player selects a desired card from the character cards A31, B32, C33, and D34, the action point AP set for the selected character card is subtracted from the total AP amount consumable in the turn Tu. The player can continuously select desired character cards until the total AP amount becomes zero. In other words, the player can select desired character cards within such a range that the sum of the action points AP of selected character cards does not exceed the total AP amount.

Thus, the action point AP corresponds to a "second parameter" and a "third parameter," and a value of the action point AP unique to each of the player characters Ca to Cd corresponds to a "second parameter value." Further, the total AP amount consumable in the turn Tu corresponds to a "third parameter value" and the "upper limit" thereof. As seen from the above, the total AP amount here corresponds to the "total cost available for selecting a desired game content from the first field (for forming a deck)" mentioned above, and a value of the action point AP unique to each of the player characters Ca to Cd corresponds to an "individual consumption cost set for each of the player characters and/or each of the game contents." Note that a change in numeric value of the total AP amount consumable in the turn Tu is displayed, for example, as an AP gauge 61 in the event field Fe as shown in FIG. 4 to make it easy for the player to recognize it (step S3 thus far).

According to the above setting, the player can compositively weigh the total consumable AP amount, the action points AP(A), AP(B), AP(C), and AP(D) unique to the respective player characters Ca to Cd and written in the respective character cards A31, B32, C33, and D34, and the rapidities RP(A), RP(B), RP(C), and RP(D) mentioned above. On that basis, the player can sequentially determine character cards to attack an enemy character, and select target character cards from the character cards A31, B32, C33, and D34 once aligned and displayed in the palette Fp.

Next, the character cards A31 and C33 selected by the player are removed from the palette Fp. For example, as shown in FIG. 4, these character cards A31 and C33 are redisplayed in the event field Fe as selected character cards A41 and C43 together with the player characters Ca to Cd. At this time, the selected character cards to be displayed in the event field Fe may be displayed in the same state (in terms of the shape, the size, and the like) as in the mode when they are displayed in the palette Fp, or displayed in a state where the entire shape is reduced as shown.

In FIG. 4, a state is shown where three character cards A31 and one character card C33 selected by the player from the palette Fp are moved to the event field Fe and rearranged adjacent to one another (arrow Ya indicate each track of the "movement"). In this case, the event field Fe corresponds to a "second field." At this time, a state in which AP values are consumed and hence the total AP amount is reduced is highlighted by hatching in the AP gauge 61 in the event field Fe. In other words, a state in which action point AP(A)×3+ action point AP(C)×1 written in the selected character cards A31 and C33 is reduced from the state of the total AP amount perfectly filled is displayed in the AP gauge 61.

When the character cards A31 and C33 to attack the enemy character are selected, and then moved and displayed from the palette Fp to the event field Fe, blanks once appear in the palette Fp in regions where these character cards A31 and C33 were arranged. Immediately after that instant, the character cards B32 and D34 remaining in the palette Fp move (slide) to the left in the drawing to move over or fill the blank regions. Along with that, new character cards including the new character cards A31 and C33 (dashed rectangles) shown in FIG. 4 appear from the right side on the screen 2 a and are filled in the palette Fp. FIG. 5 shows a state where the remaining character cards B32 and D34, and three character cards A31 and one character card C33 newly updated are rearranged adjacent to one another (step S4 thus far).

At this time, the computing unit 101 always determines whether the total AP amount in this turn Tu displayed in the AP gauge 61 is larger than zero and whether a time elapsed from the start of the turn Tu is, for example, before a preset, predetermined time (i.e., before the predetermined time is elapsed) (step S5). When this condition is satisfied (Yes in step S5), the display of the event field Fe is continued in the upper region of the palette Fp on the screen 2 a. Then, the player can additionally select another character card from the character cards rearranged as shown in the palette Fp in FIG. 5.

On the other hand, when the condition is not satisfied (No in step S5), the computing unit 101 moves the processing to the next step (i.e., battle step). In this case, as shown in FIG. 5, a battle field Fb is displayed in the upper region of the palette Fp on the screen 2 a instead of the event field Fe. In this battle field Fb, enemy characters Ea to Ec are displayed as the constituent elements in addition to the player characters Ca to Cd previously displayed. In this regard, the player characters Ca to Cd may also be displayed in another mode different from the mode displayed in the event field Fe (in terms of the shape, layout, and the like) such as to represent a battle state. Note that, when the player selects a character card, the battle field Fb may be displayed without displaying the event field Fe.

Further, for example, a so-called hit point HP as the health point or vitality is set to each of the player characters Ca to Cd prior to the start of a battle. Then, during the battle, for example, when attacks by the player characters Ca to Cd against the enemy characters Ea to Ec are interrupted or after the turn Tu is repeated predetermined times, the player characters Ca to Cd are attacked by the enemy characters Ea to Ec. When being attacked by an enemy character, the hit point HP of corresponding one of the player characters Ca to Cd is reduced according to the attack power. Note that the HP total amount of the player characters Ca to Cd is displayed as an HP gauge 62 within the battle field Fb as shown in FIG. 5 to make it easy for the player to visually recognize the HP total amount.

For example, "normal moves" and "special moves (special skills which can severely or crucially damage enemies)" are preset for each of the player characters Ca to Cd as plural kinds of attacking moves (attacking skills) capable of being thrown at (exercised over) the enemy characters Ea to Ec. For example, the "normal moves" mean moves or skills with relatively less damage to the enemy characters Ea to Ec, and the "special moves" mean moves or skills with relatively more damage to the enemy characters Ea to Ec. Damages that these normal moves and special moves can give to the enemy characters Ea to Ec may be set as always steady values or as variables. In the latter setting, for example, the damages are set to change arbitrarily according to the attributes (strength level, experience level, and the like) of the player characters Ca to Cd and/or the enemy characters Ea to Ec, the interrelation between the player characters Ca to Cd and the enemy characters, and the kind of battle type quest, and the like.

Further, in the example, a numeric value indicating how many more times an enemy character is attacked using "normal moves" to exercise a "special move" is displayed near each player character. For example, in FIG. 5, information indicating that a special move is exercised after three attacks using normal moves is shown in a geometric FIG. 8 arranged near the player character Ca. Further, information indicating that a special move is exercised after one attack using a normal move is shown in the geometric FIG. 8 arranged near the player character Cc.

In the example shown in FIG. 5, when the player character Ca throws "normal moves" at the enemy characters Ea to Ec continuously three more times before being attacked by the enemy characters, a combination of multiple normal moves (so-called "combo") occurs. When a combo occurs, a "special move" is exercised as a bonus. The computing unit 101 determines whether this combo has occurred (step S7), and when the condition is satisfied (Yes in step S7), a screen for exercising a "special move" of the player character Ca (special move exercising screen) is displayed on the screen 2 *a* (step S8). This can damage the enemy characters Ea to Ec more seriously. On the other hand, when the player character Cc throws a "normal move" at the enemy characters Ea to Ec one more time, a combo comes into effect and a "special move" is exercised, thus displaying, on the screen 2 *a*, the special move exercising screen for the player character Cc (step S8). Note that the player can also specify one specific enemy character from the enemy characters Ea to Ec to attack the enemy character with concentrated power.

As mentioned above, when the player can select the same character card continuously multiple times and the same player character corresponding to the character card can throw "normal moves" at enemy characters continuously multiple times, a combo occurs so that a "special move" can be exercised. Therefore, the player is required to elaborate an advanced operation or strategy within a limited time period to make a battle with the enemy characters in the turn Tu develop in the player's favor. In other words, the player needs to weigh the total AP amount consumable within the time period of step S4 mentioned above, the action points AP unique to the player characters Ca to Cd, and the rapidities RP, and further to elaborate an advanced operation or strategy on how the combo is generated.

Further, though not shown, numerical information indicating how many more times each enemy character is attacked before attacking a player character may be displayed near the enemy character. This enables the player to check on the timing of being attacked by the enemy character (i.e., how many more times the player character can afford to attack the enemy character before being attacked by the enemy character). This can enhance the enjoyment of the game such as to select a suitable character card from the palette Fp while taking the information further into account.

On the other hand, when the same player character selected from the player characters Ca to Cd cannot throw "normal move" attacks continuously multiple times in the turn Tu (No in step S7 because of no occurrence of a combo), the battle is ended and the results are displayed on the screen 2 *a*, for example, (step S9). For example, the battle results include the remaining amount such as the health point or vitality of the enemy characters Ea to Ec as an index of damage given to the enemy characters Ea to Ec, the total AP remaining amount (the final state of the AP gauge 61 in the turn Tu), and the total HP remaining amount (the final state of the HP gauge 62 in the turn Tu).

After steps S3 to S9 are executed, the first turn Tu is ended, and the computing unit 101 determines whether the AP remaining amount is larger than 0 and the HP remaining amount is larger than 0 (step S10). When the condition is satisfied, i.e., when both the action point AP and the hit point HP remain, a subsequent turn Tu (after the first) of the battle type quest can be repeated again. On the other hand, when the condition is not satisfied, i.e., when at least either of the action point AP and the hit point HP does not remain, this battle type quest is ended, and the game is further ended if desired.

According to the server 100 configured as mentioned above, the control method therefor, the game program, and the game system 1, candidates for the character cards A31, B32, C33, and D34 selected by the player to cause the player characters Ca to Cd to attack the enemy characters Ea to Ec are once displayed in the palette Fp. Among the candidates, the player can appropriately select character cards used to actually attack the enemy characters Ea to Ec. Then, the palette Fp is updated with new other character cards. Thus, the player can additionally select, from the palette Fp, character cards used to attack the enemy characters Ea to Ec.

This enables the player to change the combination of character cards used to attack the enemy characters Ea to Ec sequentially and desirably at the player's discretion. Therefore, the player's intention and determination (as to whether the operation or strategy designed by the player is good or bad) are effectively reflected in the result of the win or loss of the battle event. As a result, the originality and ingenuity of the player in the battle event can be elicited to improve the interest in and taste of the battle event that was monotonous work in the conventional. This can urge the player to participate in the game or drive the player's motivation to continue the game, and hence the interest in and real enjoyment of the entire game can be amplified or increased.

Further, the player is required to weight, within a limited time period, the total AP consumable amount set for the turn Tu, the unique action points AP set for the player characters Ca to Cd, and the rapidities RP. Along with this, the player is also required to select a strategically effective character card efficiently. As a result, not only can the discretion of the player in the battle type quest be increased, but also player's desires for interest can be satisfied. In addition, it is also necessary to elaborate an advanced and strict operation or strategy on how a combo capable of throwing a "special move" is generated to win the battle against the enemy characters Ea to Ec. As a result, the discretion of the player in the battle type quest can further be increased. This can further amplify or increase the interest in and real enjoyment of the entire game, further raising player's motivation to participate in the game synergistically.

Another Example of Game Progression

Figure 6:
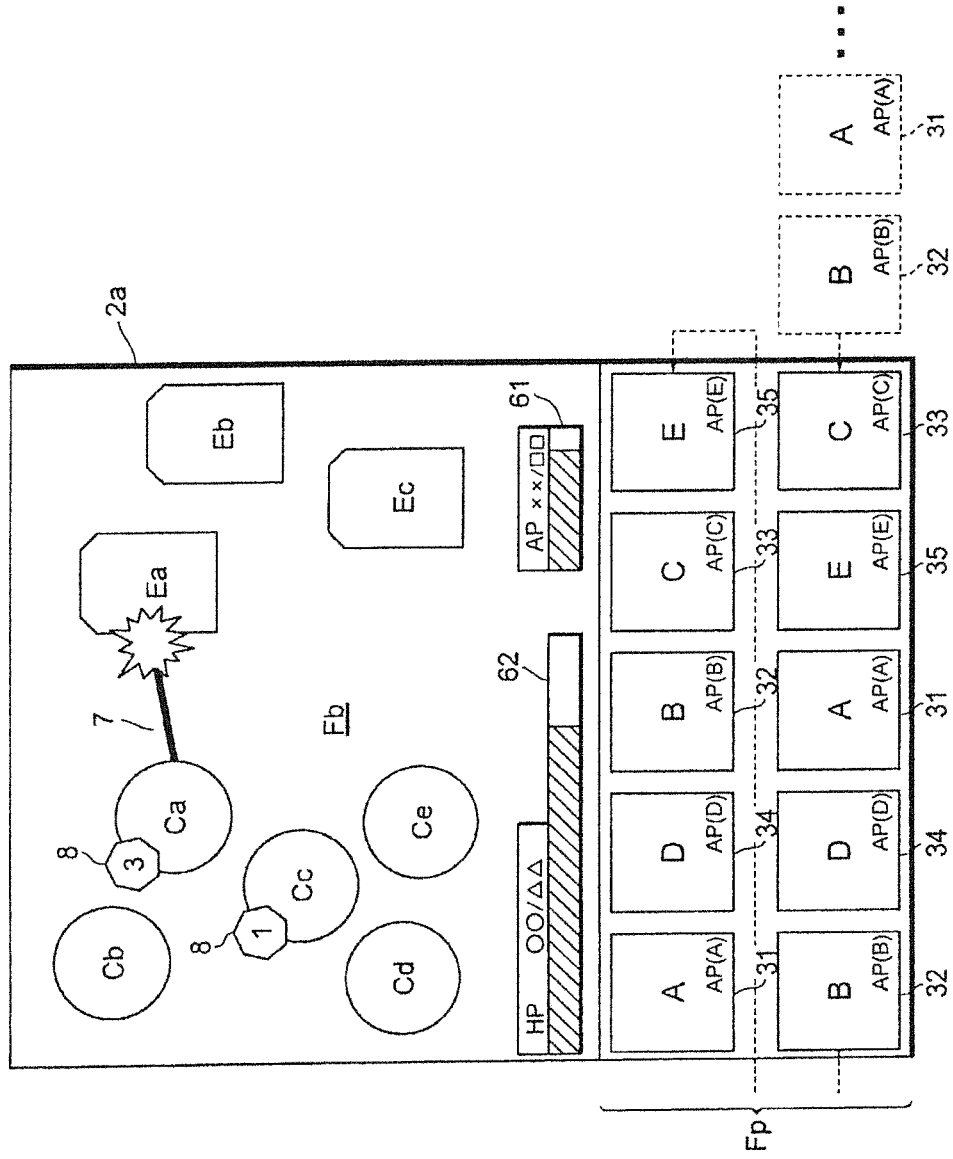
FIG. 6 is a schematic view showing another configuration example of the game screen displayed in each turn Tu in part of the game procedure shown in FIG. 3.

FIGS. 6 to 9 are schematic views showing another configuration example of the game screen displayed in each turn Tu (step S3 to S9) in some part of the game procedure shown in FIG. 3. First, in this game screen example, character cards A31, B32, C33, D34, and E35 (respectively representing player characters Ca to Ce) to be displayed in the palette Fp are primarily arranged in two or more rows (e.g., in two rows) as shown in FIG. 6. This game screen example is configured in the same way as the game screen example shown in FIG. 5 except that the player character Ce and the AP gauge 61 are additionally displayed in the battle field Fb. In this example, a display area for ten cards is defined in the palette Fp for these five kinds of character cards selected or determined by the player or the computing unit 101 (game system) of the server 100 to be characters used in the battle event, and two character cards of each kind are displayed, respectively.

In addition to the display of bar graphs in the AP gauge 61 and the HP gauge 62 as respective gauges, a numeric value of the current AP remaining amount/total AP amount (represented as xx/□□ in the drawings), and a numeric value of the current HP remaining amount/HP total amount (represented as ∘∘/ΔΔ in the drawings) may be displayed.

Further, the display of rapidities RP may be omitted from images of the character cards A31, B32, C33, D34, and E35 as shown in FIG. 6.

Even in the palette Fp with these character cards A31, B32, C33, D34, and E35 arranged in two or more rows, the player can select any single card or a combination of two or more cards from these character cards displayed. As shown in FIG. 4 and FIG. 5, the selected card(s) may be moved and displayed from the palette Fp to the event field Fe, or erased from the screen. In this case, a blank(s) once appears in the palette Fp in a region(s) where the selected character card(s) was arranged.

Immediately after that instant, character cards remaining in the palette Fp are updated to move over or fill the blank(s). At this time, for example, the cards displayed in the upper row in the drawing move (slide) to the left in the drawing. Along with that, the cards displayed in the lower row in the drawing move to the left in the drawing in the same way as the upper row while moving a character card(s) for filling the blank(s) in the upper row to the rearmost of the upper row. In other words, a character card(s) in this example is updated along the direction of dashed arrows in FIG. 6. However, the way to updating the character card(s) is not limited thereto. For example, there is a form of updating the character card(s) from each lateral side (left or right), upside, downside, or a random direction in two rows (lower and upper rows), or a form of making the character card(s) gradually appear in the blank region(s).

Figure 7:
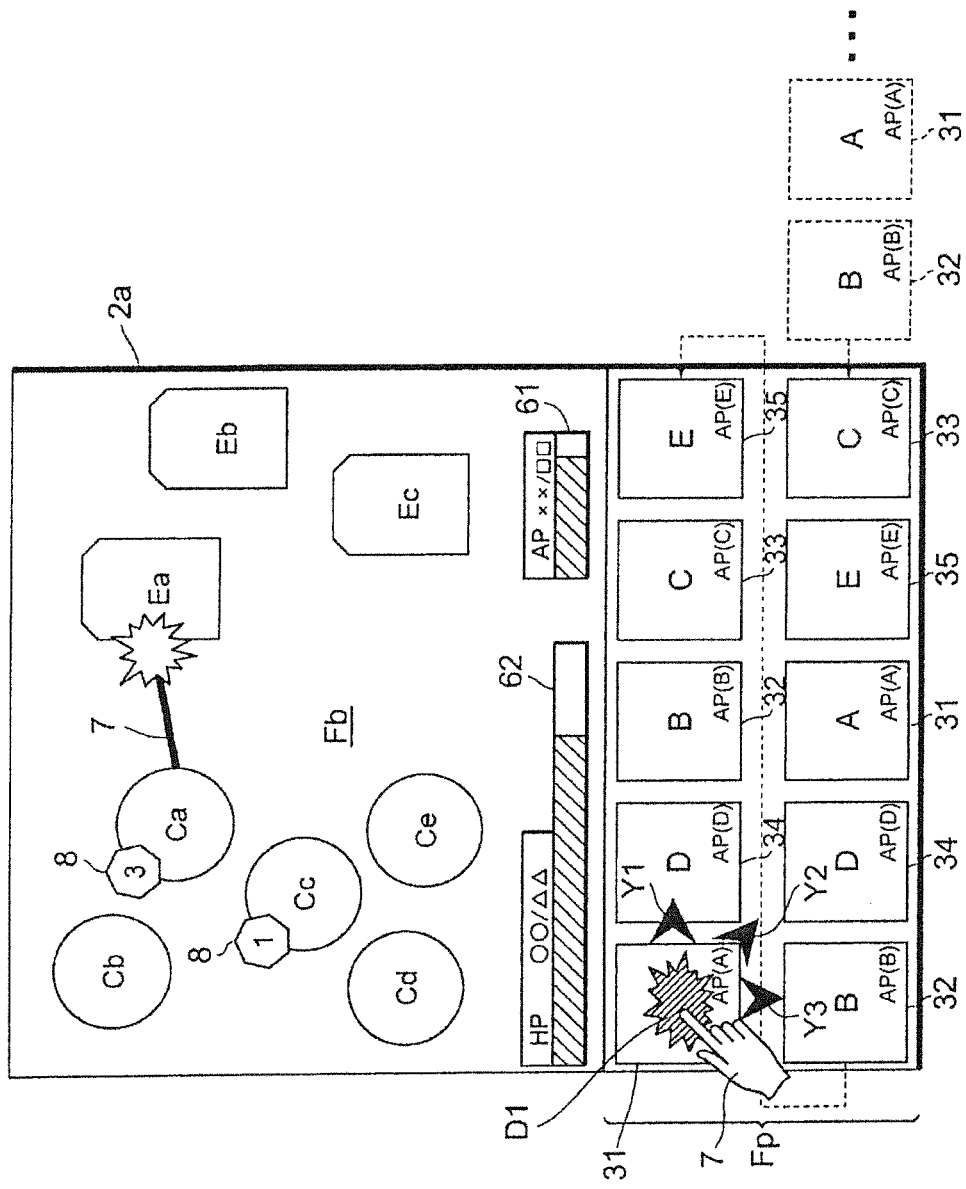
FIG. 7 is a schematic view showing the other configuration example of the game screen displayed in each turn Tu in part of the game procedure shown in FIG. 3.
Figure 8:
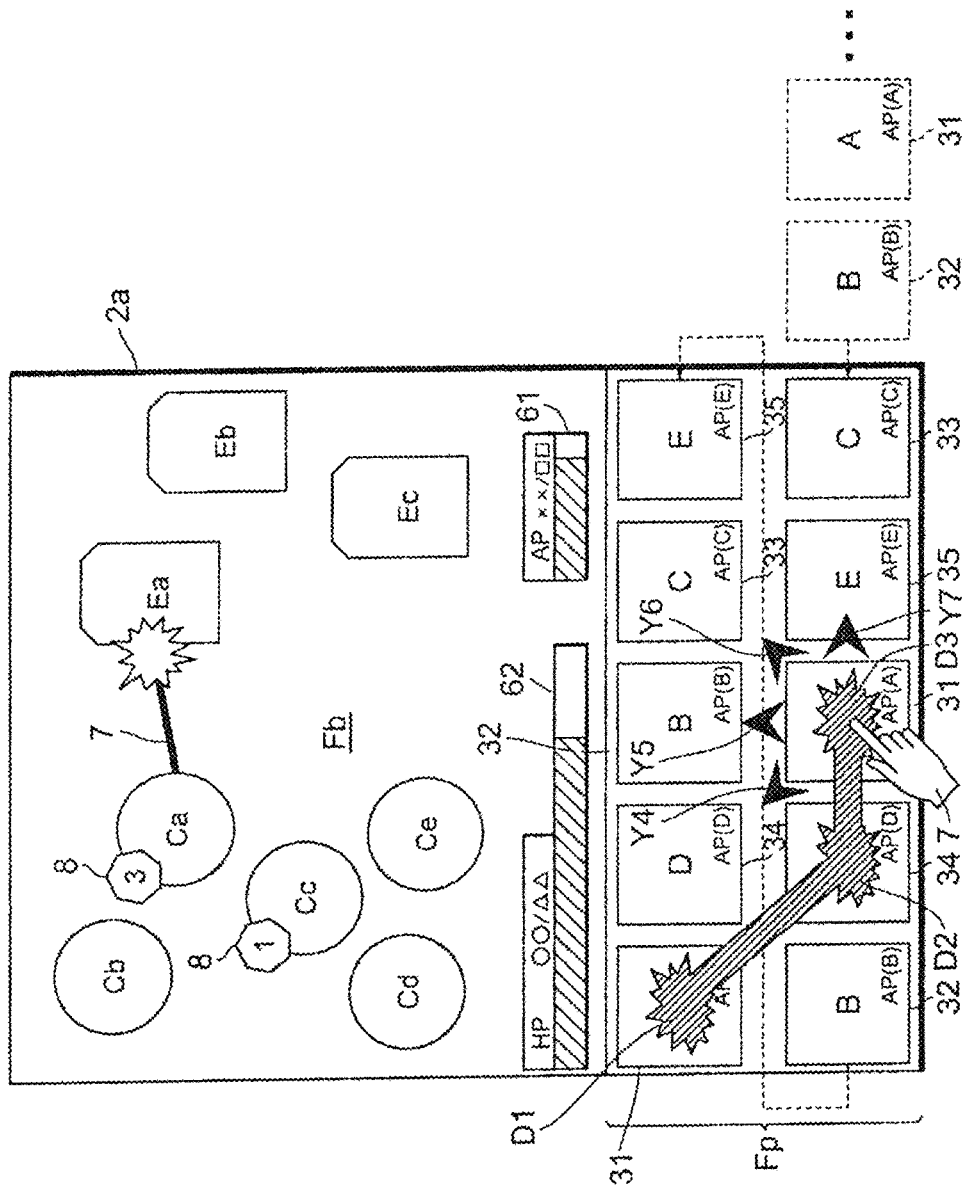
FIG. 8 is a schematic view showing the other configuration example of the game screen displayed in each turn Tu in part of the game procedure shown in FIG. 3.
Figure 9:
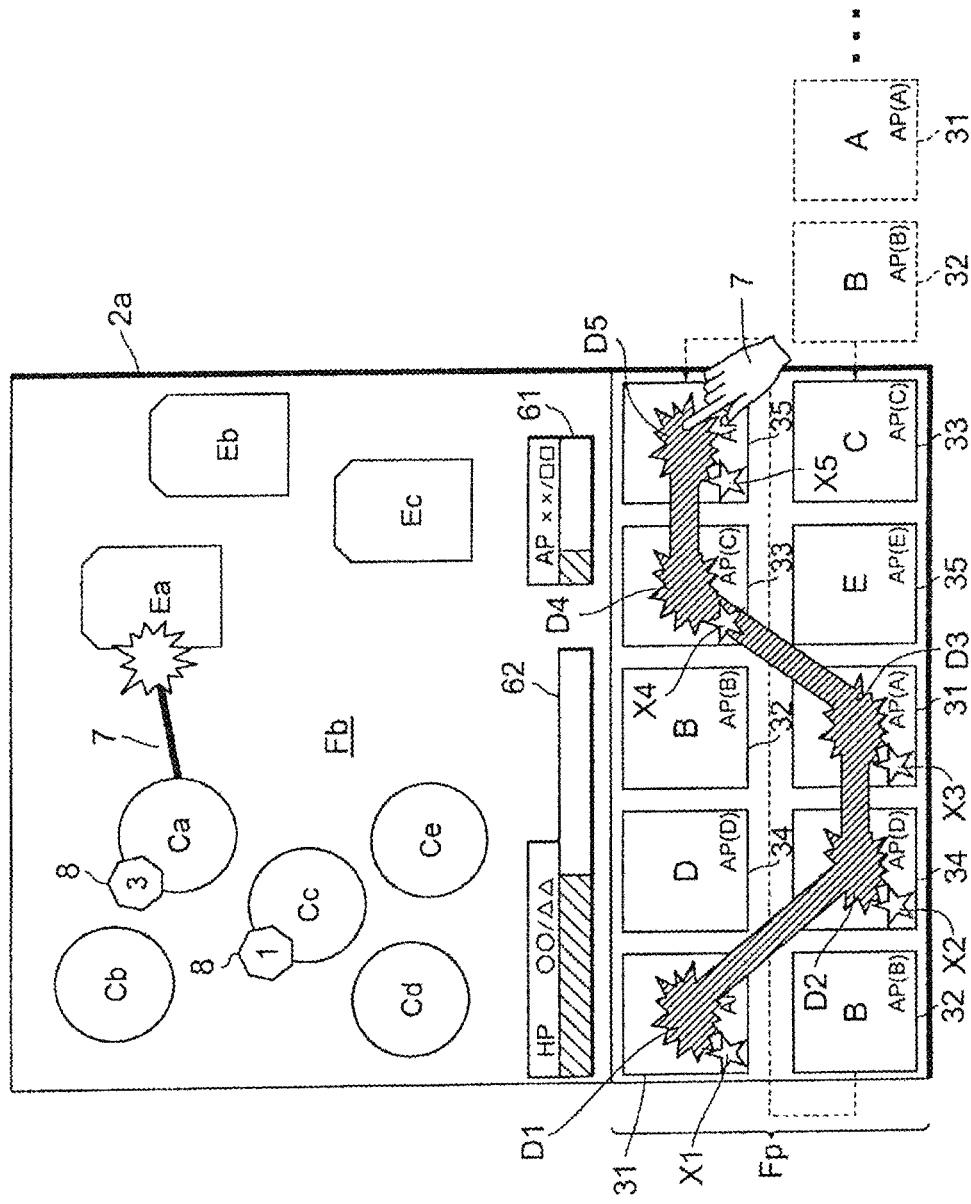
FIG. 9 is a schematic view showing the other configuration example of the game screen displayed in each turn Tu in part of the game procedure shown in FIG. 3.

Referring next to FIGS. 7 to 9, the selection of character cards here will be described in more detail. When the display of the terminal device 2 operated by the player is an electrostatic capacitive touch panel, the player can select a character card at the touch of a screen region of each of the character cards A31, B32, C33, D34, and E35 displayed in the palette Fp of the screen 2 *a*.

For example, as shown in FIG. 7, when the player touches, with a finger 7, the leftmost character card A31 in the upper row in the drawing, a selection indication D1 is displayed in the character card A31. This selection indication D1 is not particularly limited. For example, there is a form of displaying an appropriate geometric figure on the character card, a form of changing the brightness of an appropriate display region, or a form of blinking the character card.

Further, in the example, two or more character cards vertically or horizontally (left, right, top, and bottom) adjacent to the touched character card are selectable continuously, and a screen display is so provided that the player can recognize candidates for the selectable character cards. Like in the aforementioned example, the player can continue to select a desired character card until the total AP amount becomes zero. In other words, the player can select desired character cards within such a range that the sum of the action points AP of character cards to be selected does not exceed the total AP amount.

In the example shown in FIG. 7, signs indicative of candidates continuously selectable after the character card A31 first touched and selected by the player are displayed. In other words, selection candidate indications Y1 to Y3 (e.g., arrowhead-shaped geometric figures) indicating that a character card D34 located at the right side of the character card A31, a character card D34 located diagonally downward right, and a character card B32 located directly below are selection candidates are displayed. This enables the player to intuitively recognize character cards as the selection candidates. Then, the player can slide the finger 7 on the screen to trace these selection candidate indications Y1 to Y3 to select desired character cards continuously. Thus, the display of the selection candidate indications Y1 to Y3 is a kind of auxiliary guidance for the player to select character cards.

FIG. 8 shows an exemplary state when the character card D34 and the character card A31 in the lower row are traced with the finger 7 continuously from the state shown in FIG. 7 (the state where the leftmost character card A31 in the upper row in the drawing is touched) (i.e., when the finger 7 is slid continuously on the image regions of these character cards without releasing the finger 7 from the screen 2 *a*). At this time, selection indications D2 and D3 similar to the selection indication D1 are displayed on the character card D34 and the character card A31 in the lower row. Further, a trajectory that connects these selection indications D1 to D3 is so displayed that the player can intuitively confirm and grasp the character cards already selected. In addition, selection candidate indications Y4 to Y7 similar to those displayed around the leftmost character card A31 in the upper row in FIG. 7 are displayed around the character card A31 in the lower row last selected at this point.

When the character cards are selected in this way, action points AP as the costs therefor are consumed, and information on a numeric value of the remaining action point AP thus reduced is reflected in the AP gauge 61 and the numeric value located above the AP gauge 61 (see FIG. 8). Further, the display is so set that, when the next character card is selected, the selection candidate indications Y1 to Y3 previously described and the selection candidate indications Y4 to Y7 here will disappear from the screen 2 *a*. The cancellation of selection of a character card(s) (cancel processing) and/or reselection (reset processing) can also be performed. In this case, for example, the finger 7 can be slid in a direction different from the selection candidate indications Y1 to Y7 to cancel the selection of all the character cards selected by that time or the previous selection to make a reselection from the beginning. To be more specific, the "sliding in a direction different from the selection candidate indications Y1 to Y7" means that, when the finger 7 is positioned on a character card in the upper row, the finger 7 is slid to trace the screen from the position toward the upward side. Alternatively, when the finger 7 is positioned on a character card in the lower row, the finger 7 may be slid to trace the screen from the position toward the downward side.

Further, for example, specific moves called skills may be preset for player characters so that, when the situation is in a state of being able to throw the specific moves (i.e., when the skills are exercised), indications (signs) indicative of the state may be added to images of character cards arranged in the palette Fp. When the skills are exercised over two or more player characters, these character cards may be linked and selected together so that a combo move as a combination of these skills will be exercised. Like the exercise of a special move resulting from the occurrence of a combination of normal moves (combo) mentioned above, the exercise of such a combo move can give great damage to the enemy characters Ea to Ec. Thus, it can be said that purposely linking of character cards that are exercising skills to exercise a combo move and the selection of the character cards together are also a form of the occurrence of a combo.

FIG. 9 is a screen example showing an example of the selection of character cards to trigger the exercise of a combo move. The finger 7 is shifted from the state shown in FIG. 8 (the state where the selection is made up to the character card A31 in the lower row on the screen) in an upper right direction to a character card C33 in the upper row along the selection candidate indication Y6, and five character cards up to a character card E35 on the immediately right of the character card C33 are further selected without a break. In the images of these five character cards, for example, star-shaped skill exercise indications X1 to X5 are displayed to indicate that skills are exercising. Then, a combo move is exercised with significantly enhanced attack power as a result of linking and selecting these character cards together. In this case, the skills may not be exercised over all the selected character cards. When skills are exercised over some of the character cards, the attack power (strength) of the combo move may be adjusted according to the number of character cards exercising the skills. Further, as illustrated in FIG. 9, of course, only some of the character cards exercising the skills may be selected. In addition, the display of the palette Fp (character palette) itself may be erased from the screen 2 a after completion of the selection of character cards by the player (i.e., completion of an attack instruction). This can expand a battle display area in the battle field Fb, and hence a more powerful image can be displayed.

Note that, as mentioned above, this disclosure is not limited to the aforementioned example and the variations already mentioned, and that various modifications are possible as long as the spirit of the disclosure is not changed. For example, the configuration of the server 100 shown in FIG. 1 is also adapted to the client computer 21 and the mobile terminal 22 as terminal devices 2 despite some differences in throughput and the like. In other words, the client computer 21 and the mobile terminal 22 can be used as servers 100, i.e., any of computers connected through the network 200 can function as a server.

Further, in the server 100, mass-storage devices such as a hard disk and an SSD may be used to perform functions equivalent to those of the ROM 102, the RAM 103, the external memory 106, and the memory device loaded into the slot drive 108. These storage devices may not be made redundant by a RAID, or may not be connected to the computing unit 101 through a transmission path 120. For example, these storage devices may connect to any other external apparatus through the network 200 as part of cloud computing.

Further, the network interfaces in the server 100 and the terminal device 2 may be either of wireless LAN devices and wired LAN devices, and the network interfaces may be internally mounted, or may be of an external device type such as a LAN card. Further, a game machine connectable to the network 200 may be used as the terminal device 2, or otherwise, a communication karaoke machine can be used, for example.

In addition, the game settings in a battle event are also not limited to the specific examples in the aforementioned example. For example, the player can cooperate with another player (other players) participating in the game system 1 to progress the battle event. In this case, when both attacks from own player characters and attacks from player characters of the other player against enemy characters generate combos, another move with larger attack power than each "special move" (for example, "combo special move" if named) may be able to be exercised. Further, when the player selects only a character card(s) with low rapidity RP and large action point AP, the number of occurrences of a combo can become inconveniently large (such as to exceed an assumed limit). To prevent this, processing to increase the frequency of attacks by enemy characters may be performed to increase the difficulty level. As a method therefor, for example, there is processing to reduce the number of times until the start of the attacks by the enemy characters mentioned above.

It is also preferred to set the layout and rules when character cards are arranged in the palette Fp as follows: For example, an upper limit (total cost) available when character cards used in a battle event are selected or determined by the player (user) or the computing unit 101 (game system) of the server 100 is set. Then, a cost associated with each character card is also set so that character cards can be selected or determined within the total cost. Specifically, in the example of FIG. 4, it is essential only that the sum of consumption costs (total amount) of four kinds of character cards A31, B32, C33, and D34 should not exceed the upper limit (total cost) available in the battle event. The character cards selected or determined as such are arranged and displayed in the palette Fp based on predetermined rules. Even in the example of FIG. 6, it is essential only that the sum of consumption costs (total amount) of five kinds of character cards A31, B32, C33, D34, and E35 should not exceed the total cost used in the battle event. The character cards selected or determined as such are displayed in the palette Fp.

As described above, the server, the control method therefor, the program, and the game system can elicit the originality and ingenuity of the player in the battle event to improve the interest in and taste of the battle event that was monotonous work in the conventional. This can urge the player to participate in the game or drive the player's motivation to continue the game, and amplify or increase the interest in and real enjoyment of the entire game. As a result, it is possible to make wide and effective use for games in general, which are delivered, provided, and performed particularly in a server-client type network structure, software and hardware related technologies in general, which are related to delivering, providing, and performing the games, and further activities of designing, manufacturing, and selling the games.

What is claimed is:
1. A terminal device comprising:
   a storage unit configured to store, as part of information related to a game, (i) information on plural kinds of character cards in which a point for selecting a character and plural parameters are predetermined, (ii) for each character card in the plural kinds of character cards, information on a character in association with the character card, and (iii) information on a point amount for selecting a character;
   a display processing unit configured to display the plural kinds of character cards in a first field in a state of being arranged adjacent to one another and in a manner such that a character card with the point equal to or less than the point amount is selectable by a player of the game; and
   a control unit configured to send an instruction to remove a selected character card from the first field, to arrange a character corresponding to the selected character card in a second field different from the first field, and to display a new character card in the first field as substitute of the removed character card,
   wherein the control unit is further configured to, when the player selects the selected character card, subtract the point amount by the point of the selected character card, and enable a character card with the point equal to or less than the renewed point amount as selectable by the player, wherein the character corresponding to the selected character card is configured to attack an enemy character in the second field based on the plural parameters associated with the selected character card, wherein the control unit is configured to, after the control unit sends the instruction to remove the selected character card from the first field, move the new character card to the first field from a third field different from the first field, and wherein, prior to display of the new character card in the first field, the display processing unit is configured to display the new character card in the third field, wherein the third field is provided as a further visual element adjacent to the first field.

2. The terminal device according to claim 1, wherein the control unit is configured to display the new character card in the first field by moving the new character card from the third field to the first field, and filling an empty spot in the third field with a further new card.

3. The terminal device according to claim 1, wherein the third field is an offscreen area providing a plurality of new character cards and a schedule by which the plurality of new character cards are scheduled to be newly filled in the first field, wherein the new character card is provided at a first rank in the schedule prior to display of the new character card in the first field.

4. The terminal device according to claim 1, further comprising a touch panel configured to select the character card in the first field by the player; and wherein the control unit is configured to receive, on the touch panel, based on a user operation of the player corresponding to a display area of the first field, a selection of the character card.

5. The terminal device according to claim 4, wherein the display processing unit is further configured to display, prior to receipt of the user operation, at least one visual indicator on the character card, based on an identification of the character card as a selection candidate.

6. The terminal device according to claim 1, wherein the control unit is configured to increase the point amount as the game progresses irrespective of any user operation relating to the point amount.

7. The terminal device according to claim 6, wherein the control unit is configured to progress the game according to a series of turns, and wherein the control unit is configured to increase the point amount by a predetermined value once for each turn.

8. The terminal device according to claim 7, wherein the control unit is configured to determine an amount of time elapsed since the start of a turn and compare the amount of time to a set predetermined time; and wherein the control unit is configured to execute further processing comprising at least one of receiving an attack by an enemy character against the character and advancing to a next turn when the amount of time matches the set predetermined time.

9. The terminal device according to claim 1, wherein the control unit is configured to select new cards to provide to the player based on a rapidity value associated with each of the new cards.

10. The terminal device according to claim 1, wherein the display processing unit is further configured to determine, in a condition wherein the character corresponding to the selected character card is executing the attack against the enemy character in the second field, whether the attack is a normal attack or a special attack; and wherein the display processing unit is configured to, only in the case where the attack is the special attack, cause the terminal device to provide a special move exercising screen on at least part of a terminal device display.

11. A non-transitory computer readable recording medium that records a program causing the computer to perform steps of:

storing, as part of information related to a game, (i) information on plural kinds of character cards in which a point for selecting a character and plural parameters are predetermined, (ii) for each character card in the plural kinds of character cards, information on a character in association with the character card, and (iii) information on a point amount for selecting a character;

causing a display processing unit to display the plural kinds of character cards in a first field in a state of being arranged adjacent to one another and in a manner such that the character card with the point equal to or less than the point amount is selectable by a player of the game; and causing a control unit to send an instruction to remove a selected character card from the first field, to arrange a character corresponding to the selected character card in a second field different from the first field, and to display a new character card in the first field as substitute of the removed character card, further causing the control unit to, when the player selects the selected character card, subtract the point amount by the point of the selected character card, and enable a character card with the point equal to or less than the renewed point amount as selectable by the player, causing the character corresponding to the selected character card to execute an attack against an enemy character in the second field based on the plural parameters associated with the selected character card, further causing the control unit to, after the control unit sends the instruction to remove the selected character card from the first field, move the new character card to the first field from a third field different from the first field, and further causing the display processing unit to, prior to display of the new character card in the first field, display the new character card in the third field, wherein the third field is provided as a further visual element adjacent to the first field.

12. The non-transitory computer-readable recording medium according to claim 11, wherein the third field is one of:

an offscreen area providing a plurality of new character cards associated with a schedule by which the plurality of new character cards are scheduled to be newly filled in the first field; and a further visual element beneath the first field in which further cards are displayed via the display processing unit.

13. A terminal device comprising:

a storage unit configured to store, as part of information related to a game, (i) information on plural kinds of character cards in which a point for selecting a character and plural parameters are predetermined, (ii) for each character card in the plural kinds of character cards, information on a character in association with the character card, and (iii) information on a point amount for selecting a character;

a display processing unit configured to display the plural kinds of character cards in a first field in a state of being arranged adjacent to one another and in a manner such that a character card with the point equal to or less than the point amount is selectable by a player of the game;

a control unit configured to send an instruction to remove a selected character card from the first field, to arrange a character corresponding to the selected character card in a second field different from the first field, and to display a new character card in the first field as substitute of the removed character card, and a touch panel configured to receive a user operation of the player selecting the character card in the first field, and configured to display, prior to receipt of the user operation, at least one visual indicator on the character card, based on an identification of the character card as a selection candidate;

wherein the control unit is configured to receive, on the touch panel, based on the user operation of the player corresponding to a display area of the first field, a selection of the character card, and is further configured to, when the player selects the selected character card, subtract the point amount by the point of the selected character card, and enable a character card with the point equal to or less than the renewed point amount as selectable by the player, wherein the character corresponding to the selected character card is configured to attack an enemy character in the second field based on the plural parameters associated with the selected character card, and wherein the control unit is configured to, after the control unit sends the instruction to remove the selected character card from the first field, move the new character card to the first field from a third field different from the first field.

14. The terminal device according to claim 13, wherein the control unit is configured to increase the point amount as the game progresses irrespective of any user operation relating to the point amount.

15. The terminal device according to claim 14, wherein the control unit is configured to progress the game according to a series of turns, and wherein the control unit is configured to increase the point amount by a predetermined value once for each turn.

16. The terminal device according to claim 13, wherein the control unit is configured to select new cards to provide to the player based on a rapidity value associated with each of the new cards.

17. A non-transitory computer readable recording medium that records a program causing the computer to perform steps of:

storing, as part of information related to a game, (i) information on plural kinds of character cards in which a point for selecting a character and plural parameters are predetermined, (ii) for each character card in the plural kinds of character cards, information on a character in association with the character card, and (iii) information on a point amount for selecting a character;

causing a display processing unit to display the plural kinds of character cards in a first field in a state of being arranged adjacent to one another and in a manner such that the character card with the point equal to or less than the point amount is selectable by a player of the game; and causing a control unit to send an instruction to remove a selected character card from the first field, to arrange a character corresponding to the selected character card in a second field different from the first field, and to display a new character card in the first field as substitute of the removed character card, causing a touch panel to display, prior to receipt of a user operation, at least one visual indicator on the character card in the first field, based on identification of the character card as a selection candidate, and configured to receive the user operation of the player selecting the character card in the first field;

further causing the control unit to receive, on the touch panel, based on the user operation of the player corresponding to a display area of the first field, a selection of the character card, and, upon selection of the character card by the player, causing the control unit to subtract the point amount by the point of the selected character card and enable a character card with the point equal to or less than the renewed point amount as selectable by the player;

further causing the control unit to, when the player selects the selected character card, subtract the point amount by the point of the selected character card, and enable a character card with the point equal to or less than the renewed point amount as selectable by the player, causing the character corresponding to the selected character card to execute an attack against an enemy character in the second field based on the plural parameters associated with the selected character card, and further causing the control unit to, after the control unit sends the instruction to remove the selected character card from the first field, move the new character card to the first field from a third field different from the first field.

18. The non-transitory computer-readable recording medium according to claim 17, further comprising causing the control unit to increase the point amount as the game progresses irrespective of any user operation relating to the point amount.

19. The non-transitory computer-readable recording medium according to claim 18, further comprising causing the control unit to progress the game according to a series of turns, and increase the point amount by a predetermined value once for each turn.

20. The non-transitory computer-readable recording medium according to claim 17, further comprising causing the control unit to select new cards to provide to the player based on a rapidity value associated with each of the new cards.

\* \* \* \* \*